US012771221B2

(12) United States Patent
Bevilaqua et al.

(10) Patent No.: US 12,771,221 B2
(45) Date of Patent: Oct. 20, 2026

(54) AXIAL FLUX MOTOR FOR A LAUNDRY MACHINE

(71) Applicant: FISHER & PAYKEL APPLIANCES LIMITED, Auckland (NZ)

(72) Inventors: Matheus Alexandre Bevilaqua, Auckland (NZ); Graham Croxford, Auckland (NZ); David Richard Dudley Tinson, Auckland (NZ); Wagner Hoffmann, Auckland (NZ); Todd William Buchanan, Auckland (NZ); Eric Mayamaya Naling, Auckland (NZ); Werner Morgenrood, Auckland (NZ)

(73) Assignee: FISHER & PAYKEL APPLIANCES LIMITED, Auckland (NZ)

( * ) Notice: Subject to any disclaimer, the term of this patent is extended or adjusted under 35 U.S.C. 154(b) by 360 days.

(21) Appl. No.: 18/573,237

(22) PCT Filed: Jun. 29, 2022

(86) PCT No.: PCT/IB2022/056028
§ 371 (c)(1),
(2) Date: Dec. 21, 2023

(87) PCT Pub. No.: WO2023/275769
PCT Pub. Date: Jan. 5, 2023

(65) Prior Publication Data

US 2024/0297559 A1 Sep. 5, 2024

(30) Foreign Application Priority Data

Jun. 30, 2021 (AU) ................................ 2021901990

(51) Int. Cl.
*H02K 21/24* (2006.01)
*D06F 23/02* (2006.01)
(Continued)

(52) U.S. Cl.
CPC ............. *H02K 21/24* (2013.01); *D06F 23/02* (2013.01); *D06F 37/304* (2013.01); *H02K 1/146* (2013.01);
(Continued)

(58) Field of Classification Search
CPC ...... H02K 21/24; H02K 1/146; H02K 1/2795; H02K 1/30; H02K 3/522; H02K 2203/12;
(Continued)

(56) References Cited

U.S. PATENT DOCUMENTS 4,446,706 A 5/1984 Cerac
5,710,476 A * 1/1998 Ampela ................ H02K 21/24 310/264

(Continued)

FOREIGN PATENT DOCUMENTS

AU 763931 B2 12/2000
CN 102939415 2/2013

(Continued)

*Primary Examiner* — Ahmed Elnakib
(74) *Attorney, Agent, or Firm* — Clark Hill PLC; James R. Foley

(57) ABSTRACT

The present disclosure relates to a axial flux permanent magnet synchronous motor for use in a washing machine, comprising: a stator comprising a plurality of stator coils arranged about an annular core of the stator, and an insulating structure to electrically insulate the stator coils; and a rotor concentric with the stator and carrying a plurality of permanent magnets; wherein said stator and rotor are configured to rotate relative to one another about a common axis through the interaction of magnetic fields generated by the stator coils and permanent magnets, and wherein the rotor and stator are spaced relative to one another along the common axis so that the magnetic flux path between the rotor magnets and stator coils is oriented in the axial direction.

20 Claims, 38 Drawing Sheets

(51) Int. Cl.

| | |
|---|---|
| ***D06F 37/30*** | (2020.01) |
| ***H02K 1/14*** | (2006.01) |
| ***H02K 1/2795*** | (2022.01) |
| ***H02K 1/30*** | (2006.01) |
| ***H02K 3/52*** | (2006.01) |

(52) U.S. Cl.
CPC ............. *H02K 1/2795* (2022.01); *H02K 1/30* (2013.01); *H02K 3/522* (2013.01); *H02K 2203/12* (2013.01)

(58) Field of Classification Search
CPC .... H02K 1/2798; H02K 7/14; H02K 2213/03; H02K 1/16; H02K 3/47; H02K 1/182; H02K 1/27; H02K 19/06; H02K 2201/03; D06F 23/02; D06F 37/304; F16F 2230/36; F16F 15/02
USPC ..................................................... 310/156.01
See application file for complete search history.

(56) References Cited

U.S. PATENT DOCUMENTS

| | | | | |
|---|---|---|---|---|
| 6,006,553 | A | 12/1999 | Lee et al. | |
| 2002/0194884 | A1 | 12/2002 | Heyder et al. | |
| 2004/0263015 | A1* | 12/2004 | Okada | H02K 3/522 310/194 |
| 2005/0200225 | A1 | 9/2005 | Kim et al. | |
| 2006/0055275 | A1* | 3/2006 | Shim | H02K 21/16 310/216.067 |
| 2010/0050702 | A1* | 3/2010 | Kim | H02K 21/222 310/43 |
| 2010/0275660 | A1 | 11/2010 | Yoon et al. | |
| 2010/0319896 | A1 | 12/2010 | Rajaraman | |
| 2013/0127275 | A1 | 5/2013 | Camilleri et al. | |
| 2017/0250637 | A1* | 8/2017 | King | H02P 8/22 |
| 2018/0127909 | A1 | 5/2018 | Cho et al. | |
| 2020/0204016 | A1 | 6/2020 | Yan et al. | |
| 2021/0091608 | A1 | 3/2021 | Hull | |
| 2021/0135523 | A1* | 5/2021 | Yan | H02K 1/2795 |

FOREIGN PATENT DOCUMENTS

| | | | |
|---|---|---|---|
| CN | 112458702 | A | 3/2021 |
| DE | 19520330 | A1 | 12/1996 |
| EP | 947622 | B1 | 7/2003 |
| KR | 20020065003 | A | 8/2002 |
| WO | 9708805 | A1 | 3/1997 |
| WO | 2011157589 | A1 | 12/2011 |
| WO | WO 2015020454 | * | 2/2015 |
| WO | 2018155843 | A1 | 8/2018 |
| WO | 2020254969 | A1 | 12/2020 |

* cited by examiner

AXIAL FLUX MOTOR FOR A LAUNDRY MACHINE

This application is a National Phase Filing of PCT/IB2022/056028, having an International filing date of Jun. 29, 2022, which claims priority of Australian Patent Application No. 2021901990, filed Jun. 30, 2021. The disclosure of the foregoing are hereby incorporated by reference.

FIELD OF THE INVENTION

The invention relates to an axial flux permanent magnet synchronous motor suitable for use in a laundry machine such as a washer, dryer or combination washer-dryer.

BACKGROUND

Direct-drive electric motors are commonly used in laundry machines. The motor directly drives a shaft without a belt or other form of motion transmission device between the rotor and shaft in order to rotate a tub inside of the machine where laundry is held. Requirements for a direct drive electric motor in a laundry machine include that the motor produce enough torque for reliable starting, minimise motor temperature rise while performing a desired cycle of motion to treat the laundry, minimise noise during operation, and be of a minimum thickness so the motor does not take space from the laundry machine tub (therefore the laundry machine can accommodate a larger amount of clothes for a given footprint-laundry machine capacity).

Electric motors used in direct-drive laundry machines are commonly of the radial flux—permanent magnet synchronous motor type (RF-PMSM), with an external rotor. The magnetic flux path is oriented radially.

An axial flux permanent magnet synchronous motor (AF-PMSM) is one in which the magnetic flux is oriented axially. AF-PMSM motors have previously been proposed for use in laundry washing machines (see US patent specification 20100275660 and PCT international patent specification WO2018155843) yet are not commonly in use and have proven difficult to implement in practice. In particular, optimal performance of the AF-PMSM motor depends on maintaining a constant air gap between the stator and rotor in the axial direction. This can be difficult to maintain in laundry machine applications where the motor is subject to internal forces and external forces/vibrations from revolving laundry loads.

It is an object of the invention to provide an improved or at least alternative form of AF-PMSM motor suitable for use to drive the load-containing drum in a laundry machine (such as a washer, dryer or combination washer-dryer) and an improved or at least alternative laundry machine driven by such a motor.

SUMMARY OF INVENTION

In broad terms the invention comprises an axial flux permanent magnet synchronous motor for use in a laundry machine, comprising:

a. A stator comprising a plurality of stator coils arranged about an annular core of the stator, and an insulating structure to electrically insulate the stator coils; and b. A rotor concentric with the stator and carrying a plurality of permanent magnets;

wherein said stator and rotor are configured to rotate relative to one another about a common axis through the interaction of magnetic fields generated by the stator coils and permanent magnets, and wherein the rotor and stator are spaced relative to one another along the common axis so that the magnetic flux path between the rotor magnets and stator coils is oriented in the axial direction.

In one embodiment the motor comprises a single rotor and a single stator.

In some embodiments said annular core of the stator has an inner diameter of between about 160 mm and about 250 mm.

In some embodiments said annular core of the stator has an outer diameter:

a. of between about 50-100 mm greater than the inner diameter; and/or b. of about 350 mm or less.

In some embodiments the torque constant is between 7-12 Nm/A.

In some embodiments the height of the stator core in the axial direction is about 30 mm or less.

In some embodiments the overall height in the axial direction is about 45 mm or less.

In some embodiments the rotor magnets and stator coils are spaced in the axial direction to define between them an air gap of between about 0.2 and 1.8 mm.

In some embodiments the air gap is between 0.4 and 1.5 mm.

In some embodiments the air gap is between 0.9 and 1.1 mm.

In some embodiments the air gap is approximately 1.2 mm.

In some embodiments the ratio of magnetic poles carried by the stator to magnetic poles carried by the rotor is 3:4.

In some embodiments the number of stator coils carried by the stator is 27.

In some embodiments the number of electromagnetic symmetries of the core is between 5 and 12, or optionally, is 9.

In some embodiments the stator coils are electrically connected to one another in a 3 phase configuration.

In some embodiments the stator core is spiral wound from electrical steel strips.

In some embodiments the stator core comprises a plurality of teeth extending in the axial direction, and wherein each one of said stator coils is carried by a corresponding one of said plurality of teeth.

In some embodiments the plurality of teeth have a height in the axial direction of about 26 mm or less.

In some embodiments adjacent ones of the plurality of teeth define between them a slot of about 10-20 mm in width.

In some embodiments the width of the slot at the outer perimeter of the annular core of the stator is greater than the width of the slot at an inner perimeter of the annular core of the stator.

In some embodiments the teeth have a tipless shape.

In some embodiments the teeth have chamfered edges.

In some embodiments the stator core comprises a yoke portion, with the plurality of teeth extending axially from one side of the yoke portion.

In some embodiments that yoke portion and teeth of the stator core are integrally formed.

In some embodiments the insulating structure comprises a plurality of bobbins, each mounted upon a one of said plurality of teeth and carrying a one of said plurality of stator coils.

In some embodiments the plurality of bobbins are made of a polymeric material.

In some embodiments one or more of the plurality of bobbins comprise a guide structure configured to maintain a physical separation between the electrical connections of adjacent stator coils.

In some embodiments the guide structure comprises a plurality of stepped guide surfaces and optionally one or more guide teeth dividing each stepped guide surface.

In some embodiments the magnets are made of sintered ferrite.

In some embodiments the plurality of permanent magnets are each a discrete piece of magnetic material formed in a rectangular shape, or alternatively, are each a discrete piece of magnetic material formed in a tapered shape.

In some embodiments each magnetic pole of the rotor is represented by a single discrete piece of magnetic material.

In some embodiments said plurality of permanent magnets are arranged about an annular region of the rotor concentric with the annular core of the stator.

In some embodiments said plurality of permanent magnets are arranged about an annular region of the rotor, and wherein the annular width of the stator core is between about 0 and about 10 mm less than the annular width of the annular region of the rotor.

In some embodiments the permanent magnets are between about 5 mm and 6.5 mm thick.

In some embodiments the permanent magnets are each a discrete piece of magnetic material having a constant thickness, or alternatively having a bread loaf shape.

In some embodiments the radially aligned edges of the permanent magnets are chamfered.

In some embodiments the permanent magnets comprise a rectangular portion wherein the radially aligned edges are parallel and a tapered portion wherein the radially aligned edges taper towards each other.

In some embodiments the tapered portion is located at or towards one or both of an inner and outer perimeter of the rotor.

In some embodiments the tapered portion of the permanent magnet overhangs the inner perimeter of the rotor.

In some embodiments the tapered portion does not extend more than half of the overall length of the magnet, and preferably not more than a third, or a quarter of the overall length.

In some embodiments the rotor is a moulded polymeric material.

In some embodiments the rotor is moulded from Bulk Moulding Compound.

In some embodiments the rotor comprises a rotor hub for connecting the rotor to a drive shaft of the washing machine, optionally wherein the rotor hub is made of steel.

In some embodiments the rotor hub is insert moulded into the polymeric material of the rotor.

In some embodiments the rotor hub comprises engagement features for engaging with the drive shaft.

In some embodiments the engagement features are provided in the form of internal splines configured to engage with corresponding splines on the drive shaft.

In some embodiments an annular backing ring for the magnets is moulded into the annular region of the rotor, optionally wherein the annular backing ring is made of steel.

In some embodiments the rotor has a profile such that the height of the rotor is greatest at or near the rotor hub, and decreases at or toward the annular region.

In some embodiments the annular region comprises radially extending ribs or legs.

In some embodiments the rotor comprises a reinforced region radially inward of the annular region about the rotor hub.

In some embodiments the reinforced region is substantially hollow and comprises a network of radially and/or circumferentially extending ribs.

In some embodiments the rotor comprises a lip about the exterior of the annular region.

In some embodiments the motor further comprises a fastening portion for attaching the stator to the body of the washing machine.

In some embodiments the fastening portion is formed as part of the stator itself.

In some embodiments the fastening portion is configured to engage a bearing housing of a drum of the washing machine, or a supporting structure extending outwardly from said bearing housing.

In some embodiments the fastening portion attaches the stator to rear of an outer drum of the washing machine.

In some embodiments the fastening portion is configured to receive between 3-6 fasteners for attaching the stator to the washing machine.

In some embodiments the fastening portion is configured to receive between 4-5 fasteners for attaching the stator to the washing machine.

In some embodiments the fastening portion comprises an outer annular region extending radially outward from the annular stator core, the outer annular region comprising apertures for receiving fasteners.

In some embodiments the fastening portion comprises an inner annular region extending radially inward of the annular stator core, the inner annular region comprising apertures for receiving fasteners.

In some embodiments the outer annular region is for attaching the fastening portion to the core of the stator and the inner annular region is for attaching the fastening portion to the washing machine.

In some embodiments the apertures of the inner annular region are arranged about a pitch circle having a pitch diameter between 120-140 mm, preferably between 126-134 mm.

In some embodiments at least one of the inner and outer annular regions are formed of steel.

In some embodiments the fastening portion is formed at least in part from an overmoulded polymeric material.

In some embodiments the polymeric material is Bulk Mounding Compound.

In some embodiments the fastening portion comprises vibration attenuation means configured to attenuate vibration of the stator during operation.

In some embodiments the vibration attenuation means comprise any one or more of apertures, slots, ribs or reinforced regions, such that the vibration of the stator during operation is absorbed by an elasticity of the fastening portion.

In some embodiments the vibration attenuation means comprise one or more radially or circumferentially extending slots.

In some embodiments the vibration attenuation means comprise one or more radially or circumferentially extending ribs.

In some embodiments the vibration attenuation means comprise one or more reinforced or thickened sidewalls.

In some embodiments the fastening portion has a conical profile.

In some embodiments the inner annular region of the fastening portion is provided by an inwardly extending flange of the annular stator core.

In some embodiments the fastening portion is an over-moulding of the stator core.

In some embodiments the fastening portion is an over-moulding of the stator core and stator coils.

In some embodiments the stator comprises one or more terminal connections, optionally wherein the terminal connections comprises one or more metallic pins, each pin retained in and extending from a plastic pocket.

In some embodiments the one or more terminal connections are located on an outer perimeter of the stator.

In some embodiments the rotor frame comprises one or more shaped holes through to the stator, said one or more holes adapted to receive tool for prizing the rotor frame away from the stator.

In a further aspect the invention may comprise a tool for use with the motor configured to prize the rotor frame away from the stator, wherein tool comprises a threaded shaft with a foot at the distal end, a handle at the proximal end and a nut located between the foot and the handle, wherein the nut is shaped to pass through the shaped hole of the rotor frame in a first orientation of the shaft and held within the shaped hole in a second orientation, wherein the tool is further configured such that in use the distal end of the shaft is inserted in the first orientation through one of the one or more shaped holes in the rotor frame and transitioned to the second orientation capturing the nut, wherein rotation of the handle and shaft about the captured nut causes the foot to move towards the underlying stator, away from the captured nut such that the rotor frame and stator are pushed apart.

In another aspect, in broad terms the invention comprises an axial flux permanent magnet synchronous motor for driving the load-containing drum of a laundry machine, comprising:

a. A single stator comprising:
   i. a metallic annular core with a cylindrical yoke portion and integrally formed teeth extending axially from one side of the yoke portion;
   ii. a polymeric bobbin carried upon each one of the plurality of teeth; and
   iii. a plurality of stator coils wound about each one of the bobbins;
   iv. a polymeric fastening portion extending inwardly of the annular core and adapted to receive a plurality of fasteners for fastening the stator to the laundry machine; and
b. A single rotor concentric with the stator and carrying a plurality of permanent magnets;

wherein said stator and rotor are configured to rotate relative to one another about a common axis through the interaction of magnetic fields generated by the stator coils and permanent magnets, and wherein the rotor and stator are spaced relative to one another along the common axis so that the magnetic flux path between the rotor magnets and stator coils is oriented in the axial direction.

The optional embodiments previously described in respect of other aspects of the inventions apply as options to this aspect of the invention also.

In another aspect in broad terms the invention comprises a laundry machine comprising an outer cabinet, an outer drum suspended in the outer cabinet, and an inner drum housed within the outer drum and rotatable relative to the outer drum, wherein rotation of the inner drum is directly driven by an axial flux motor of any preceding embodiment.

In some embodiments a drive shaft transmits rotation from the rotor of the motor to the inner drum of the laundry machine.

In some embodiments the laundry machine comprises a bearing housing to house one or more bearings that support the drive shaft.

In some embodiments the outer drum comprises a polymeric end wall.

In some embodiments the bearing housing is held or moulded within the end wall.

In some embodiments the stator is adapted to fasten to the bearing housing or other metallic support.

In some embodiments the stator is fixed between the end wall and the rotor, with the rotor as the outermost part of the motor.

It is intended that reference to a range of numbers disclosed herein (for example, 1 to 10) also incorporates reference to all rational numbers within that range (for example, 1, 1.1, 2, 3, 3.9, 4, 5, 6, 6.5, 7, 8, 9 and 10) and also any range of rational numbers within that range (for example, 2 to 8, 1.5 to 5.5 and 3.1 to 4.7) and, therefore, all sub-ranges of all ranges expressly disclosed herein are hereby expressly disclosed. These are only examples of what is specifically intended and all possible combinations of numerical values between the lowest value and the highest value enumerated are to be considered to be expressly stated in this application in a similar manner.

In this specification the term "comprising" means "consisting at least in part of". When interpreting a statement in this specification and claims that includes "comprising", features other than that or those prefaced by the term may also be present. Related terms such as "comprise" and "comprises" are to be interpreted similarly.

In this specification where reference has been made to patent specifications, other external documents, or other sources of information, this is generally for the purpose of providing a context for discussing the features of the disclosure. Unless specifically stated otherwise, reference to such external documents is not to be construed as an admission that such documents, or such sources of information, in any jurisdiction, are prior art, or form part of the common general knowledge in the art.

The disclosure may also be said broadly to comprise in the parts, elements and features referred to or indicated in the specification of the application, individually or collectively, in any or all combinations of two or more of said parts, elements or features. Where, in the foregoing description reference has been made to integers or components having known equivalents thereof, those integers are herein incorporated as if individually set forth.

To those skilled in the art to which the disclosure relates, many changes in construction and widely differing embodiments and applications of the disclosure will suggest themselves without departing from the scope of the disclosure as defined in the appended claims. The disclosures and the descriptions herein are purely illustrative and are not intended to be in any sense limiting. Where specific integers are mentioned herein which have known equivalents in the art to which this disclosure relates, such known equivalents are deemed to be incorporated herein as if individually set forth. The disclosure comprises the foregoing and also envisages constructions of which the following gives examples only.

BRIEF DESCRIPTION OF DRAWINGS

FIG. 4AA shows a portion of strip of electrical steel material suitable to be wound in a spiral shape to construct the stator core shown in FIG. 4A.

DETAILED DESCRIPTION

1. Overview

Figure 1:
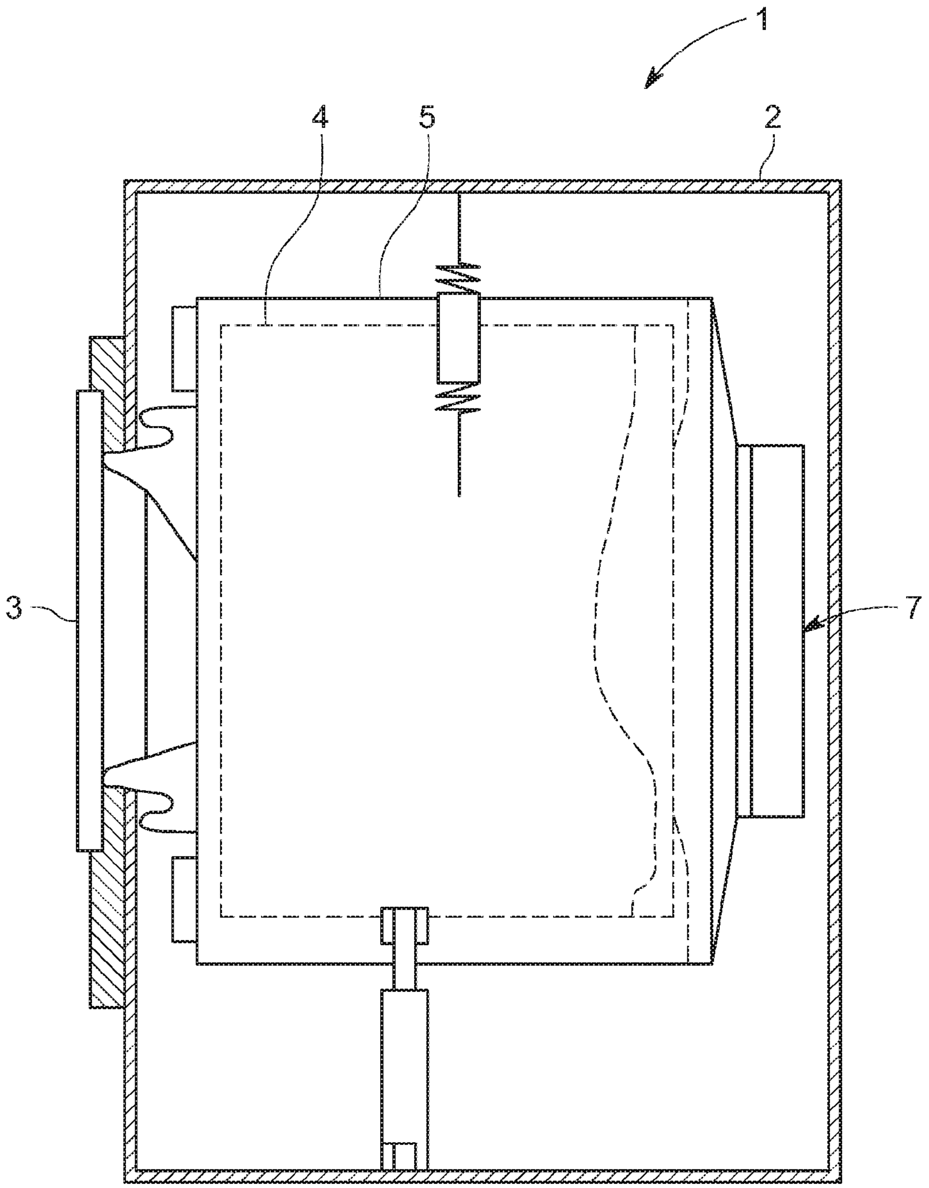
FIGS. 1 and 2 show a laundry machine in diagrammatic form that is directly driven by an axial flux motor.

The present embodiments relate to an Axial Flux Permanent Magnet Synchronous Motor (AF-PMSM or more generally axial flux motor). The motor 20 is for use in a direct drive laundry apparatus ("laundry machines") 1.

The axial flux motor 20 will be described on its own. A general embodiment of an axial flux motor 20 will be described that could be used in a laundry machine 1. Variations to the general embodiment can provide exemplary embodiments, as will be described later. Use of the axial flux motor in a laundry machine will then be described.

2. Axial Flux Motor—General Embodiment

FIGS. 3A to 7 show a general embodiment of an axial flux motor 20. FIGS. 3A to 3E show the general arrangement, although with the stator coil windings omitted for clarity. FIGS. 4A to 7 show various views of the components of the motor in isolation. The axial flux motor comprises a rotor 21 and a stator 22. The components are axially and concentrically arranged. FIG. 3D shows a cross-section of a portion of the motor 20, showing the stator 22 (with a stator core 60 carrying an insulating structure 100 upon which stator coils can be wound) and rotor 21 (with rotor magnets 130). These details will become apparent from the following description.

Details of the axial flux motor 20 will now be described with reference to FIGS. 3A to 11B.

2.1 Stator

Figure 4A:
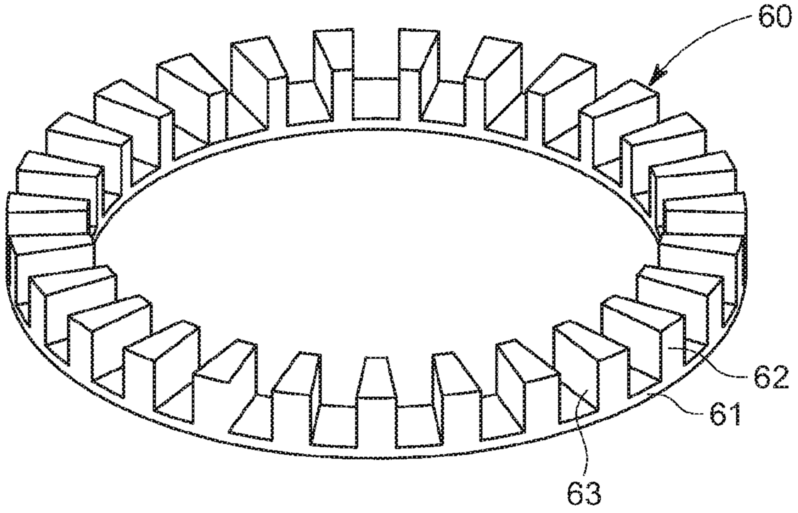
FIG. 4A shows, in isolation, the stator core of the assembly shown in FIGS. 3A-3E.
Figure 4A:
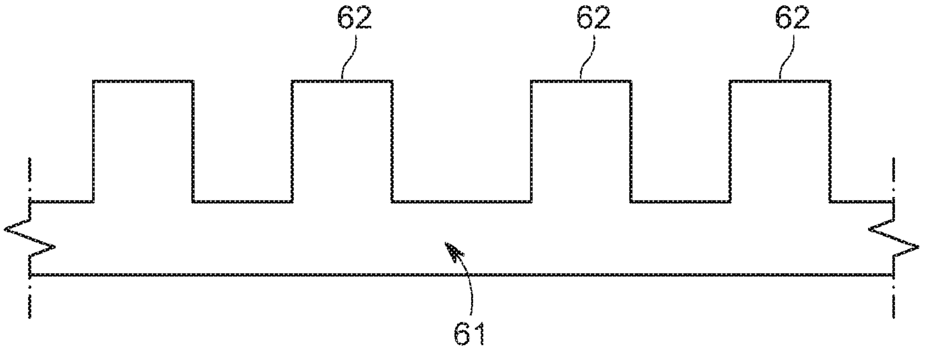
Figure 4B:
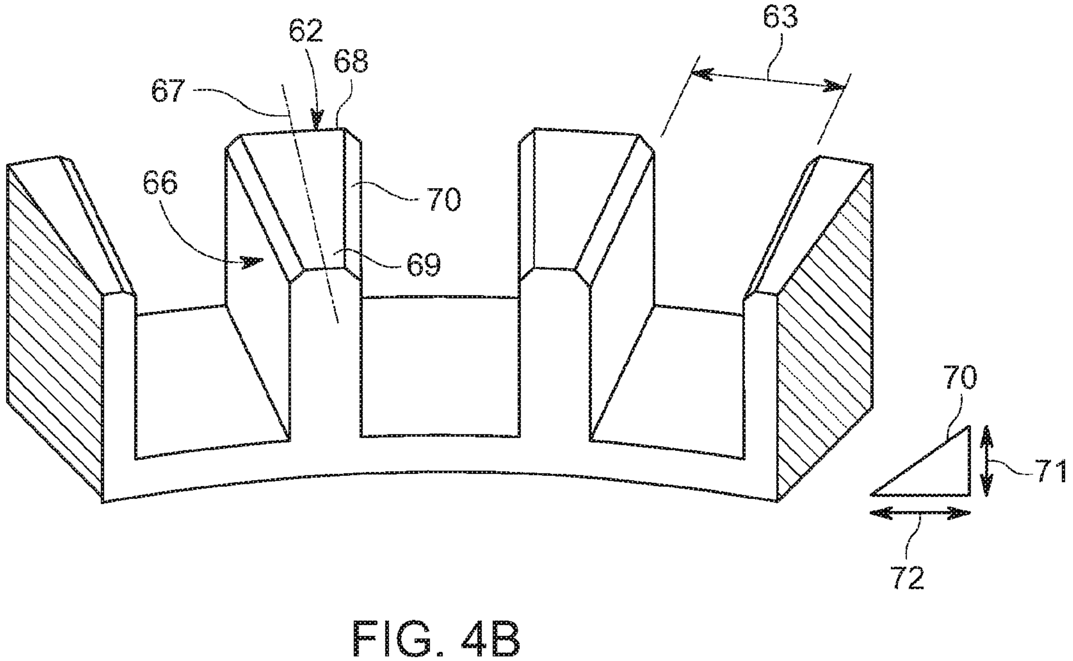
FIG. 4B shows in detail a segment of the stator core shown in FIG. 4A.
Figure 4C:
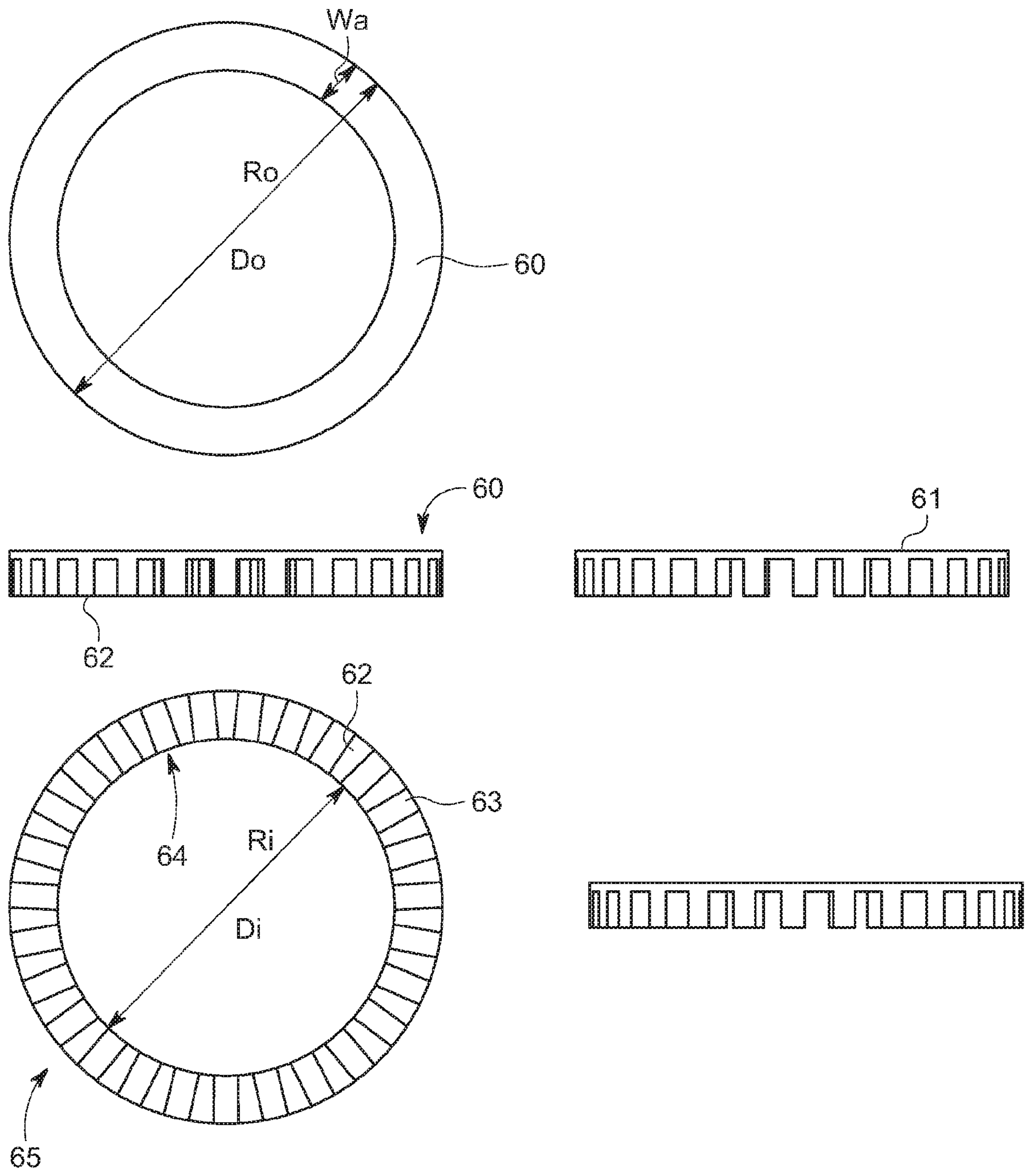
FIG. 4C shows additional views of the stator core of FIGS. 4A and 4B.
Figure 5A:
FIGS. 5A and 5B show the core and insulating structure of the assembly shown in FIGS. 3A-3E, both with and without stator coil windings present.
Figure 5B:
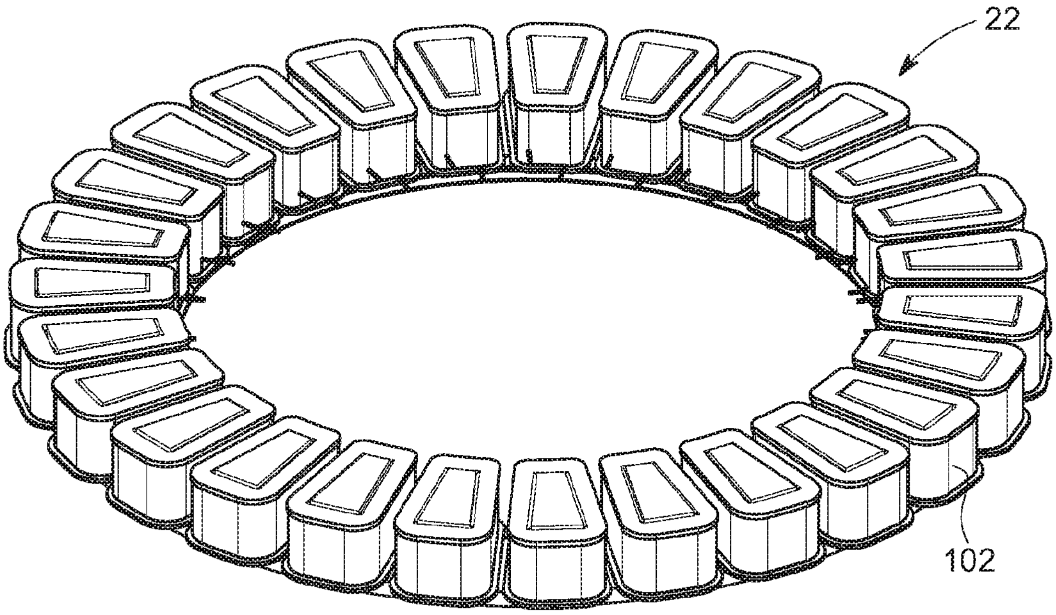
Figure 6:
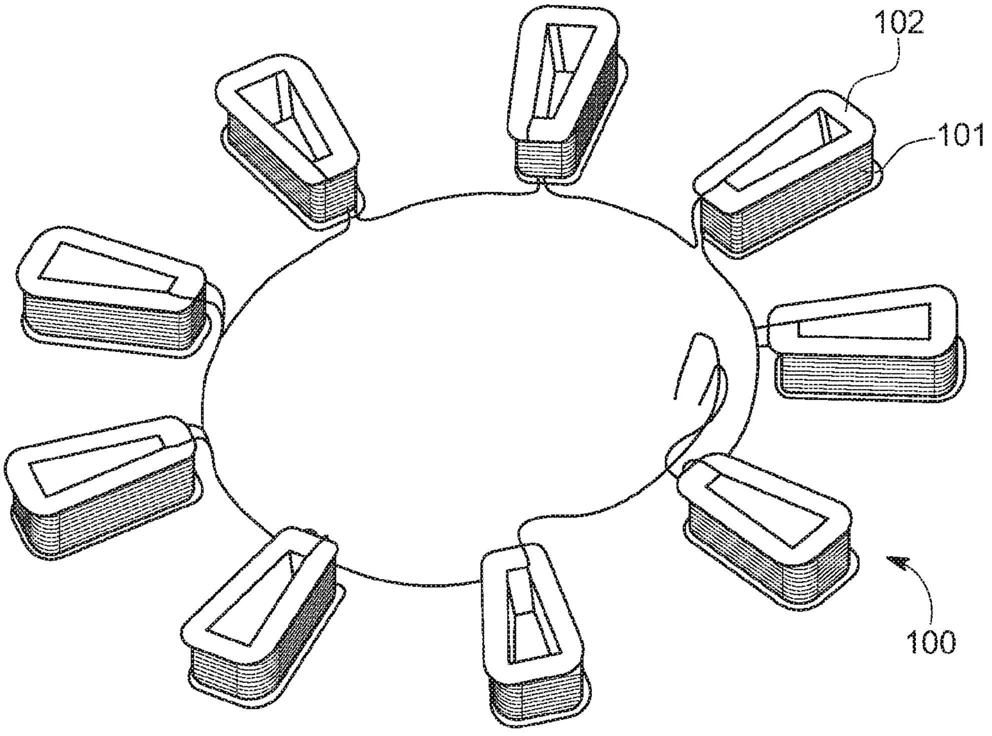
FIG. 6 shows bobbins of the insulating structure wound with stator coils that are electrically connected.

FIGS. 4A to 6 show the stator 22 in more detail. FIGS. 4A to 4C show the stator core 60 without the insulating structure 100 and stator coils 101, and FIGS. 5A to 5B show the core 60 and insulating structure 100 with and without stator coils 101 (stator windings), and FIG. 6 shows the stator coils 101.

As seen best in FIG. 4A, the stator 22 comprises an annular stator core 60, comprising a stator yoke (annular base) 61, with a plurality of teeth 62 spaced around the yoke to create slot openings/gaps 63 between them. In some embodiments the stator has at least 15 teeth, and in some embodiments between 15-40 teeth. As seen in FIG. 4C, the stator core 60 has an inner diameter Di/radius Ri leading to an inner perimeter 64. The stator core 60 also has an outer diameter Do/radius Ro leading to an outer perimeter 65. The stator core 60 has an annular width Wa, which is the difference between the outer radius Ro and the inner radius Ri. In some embodiments that stator core 60 has an inner diameter of between 160 mm and 250 mm. The outer diameter of the stator core may be between 50 mm and 100 mm greater than the inner diameter. In some embodiments the stator core 60 may have an outer diameter of 350 mm or less.

As can be seen in FIG. 4B, each tooth 62 (or "teeth" in the plural) of the core 60 comprises a tooth stem with side walls 66 and is tapered (at an angle relative to a datum 77) to form a wedge/triangular cross-section profile extending from a base 68 on the outer perimeter 65 of the core 60 to a tip 69 on the inner perimeter 64 of the core 60. The datum 67 from which the angle can be measured is a midline through the tooth stem between the base 68 and the tip 69. The width of the tooth stem base (OD) is longer than the width of the tooth stem tip (ID), and the tooth stem has a tooth stem length which is the distance between the tooth stem base 68 and the tooth stem tip 69. The base and tip can be curved commensurate with the curvature of the outer and inner perimeters of the core 60. In some embodiments the teeth 62 have a tipless shape, i.e. the stator is of an "open-slot" configuration.

In some embodiments the top of each tooth 62 may have a chamfer 70 along each of the angled edges between the base 68 and the tip 69 where they meet the side wall 66. Seeing the insert of FIG. 4B, this chamfer 70 can have an axial dimension 71 and a radial dimension 72, wherein those axial and radial dimensions are not necessarily equal. The chamfer 70 on the stator tooth stem allows the motor 20 to have low cogging, which reduces the vibration and consequently the noise.

Figure 12:
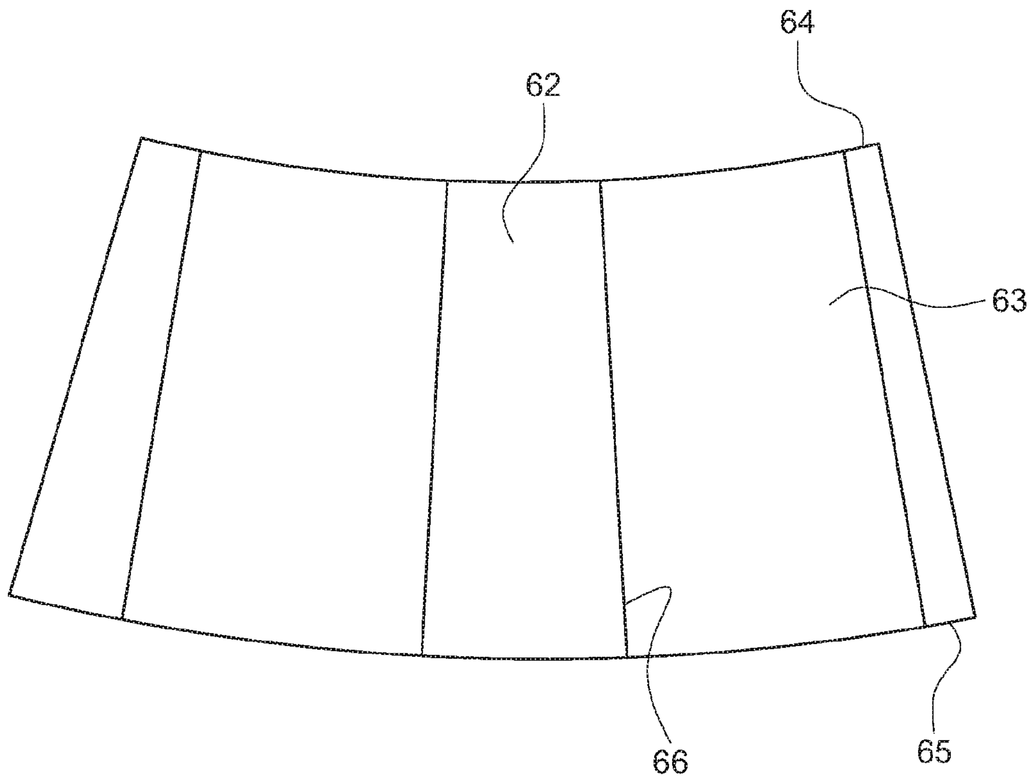
FIG. 12 shows a segment of the stator core according to an embodiment of the invention.

The slot opening 63 has a width, which is preferably constant across the width of the annular core Wa, by virtue of the angle of adjacent tooth stems being such that the opposing sides 66 of neighbouring tooth stems 62 are parallel. In some embodiments the slot is between about 10 mm and about 20 mm in width. FIG. 12 shows an alternative embodiment in which the slot opening 63 has a width that is greater at the outer perimeter 65 of the annular stator core than at the inner perimeter 64 of the annular stator core 60. The opposing sides 66 of neighbouring tooth stems 62 thus taper towards each other in the direction of the inner perimeter 64 of the stator core 60. In a particular embodiment, the width of the slot opening 63 is several mm greater at the outer perimeter 65 of the stator core 60 that at the inner perimeter 64. In a further embodiment, the width of the tooth stem base (OD) is the same as the width of the tooth stem tip (ID). The tooth stem 62 has a height/thickness in the axial direction. In some embodiments the teeth may have a height/thickness in the axial direction of about 26 mm or less, and/or a thickness in the radial direction (i.e. tooth stem length) of between about 25 mm and about 50 mm. The yoke 61 has a thickness Ty which may be about 4 mm to about 6 mm. The stator core 60 has an overall height in the axial direction (Sh) which is a combination of the yoke thickness and the tooth stem height. In some embodiments the overall height of the stator core in the axial direction is about 30 mm or less.

The stator could be constructed in any suitable manner, such as constructed from laminations. For example, the stator core 60 may be constructed by winding strips of electrical steel in a spiral configuration. The strips of steel may have the profile of the stator yoke 61 and teeth 62 punched or cut into them prior to winding as shown in FIG. 4AA. In alternative embodiments it may be possible to construct the core 60 from a sintered material such as a Soft Magnetic Composite. In some embodiments, such as those just described, the stator may be of a unitary construction with the yoke 61 and teeth 62 portions formed integrally.

FIGS. 5A and 5B show the insulating structure 100 and stator coils 101. In some embodiments the insulating structure comprises a plurality of bobbins 102 each of which may be mounted on a tooth 62 of the core 60. Each bobbin 102 carries a stator coil 101 and is made from a non-conductive material (such as plastic) to electrically insulate the coil 101. In some embodiments, the bobbins 102 are made as a series of separate and identical parts, each of which is fitted over a respective one of the stator teeth 62. The bobbins 102 may be fitted to the stator teeth 62 before the stator coils 101 are wound on using a needle winding technique. In an alternative embodiment, the stator coils 101 are wound on to the individual bobbins 102 and the bobbins 102 are subsequently fitted over a respective one of the stator teeth 62.

Figure 20A:
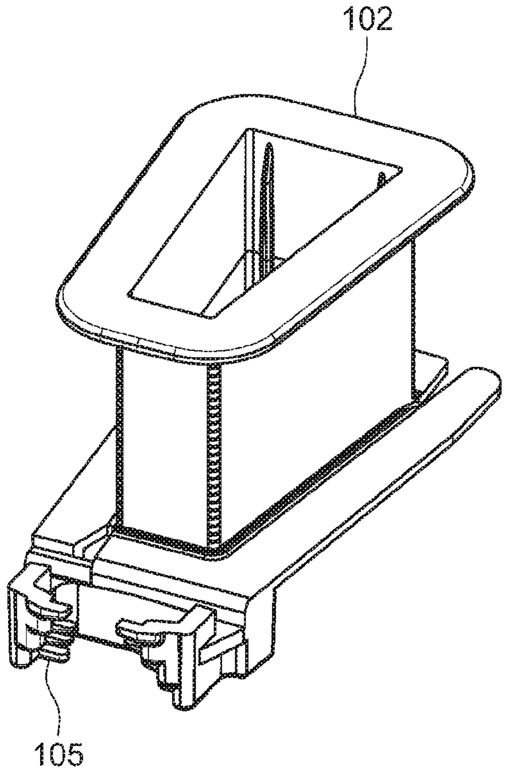
FIGS. 20A-20C show a stator bobbin arrangement according to an embodiment of the invention.

FIG. 20A depicts an embodiment in which one or more of the bobbins 102 includes a guide surface 105 located at its foot in order to aid in the application of the stator coil 101. The guide surface 105 functions to maintain a physical separation between the wires of adjacent stator coils 101 as shown in FIG. 20C. Although these wires are typically insulated, it has been found to be desirable to keep them separated so that they do not rub on each other and cause damage to themselves and/or the insulating structure 100.

Figure 20B:
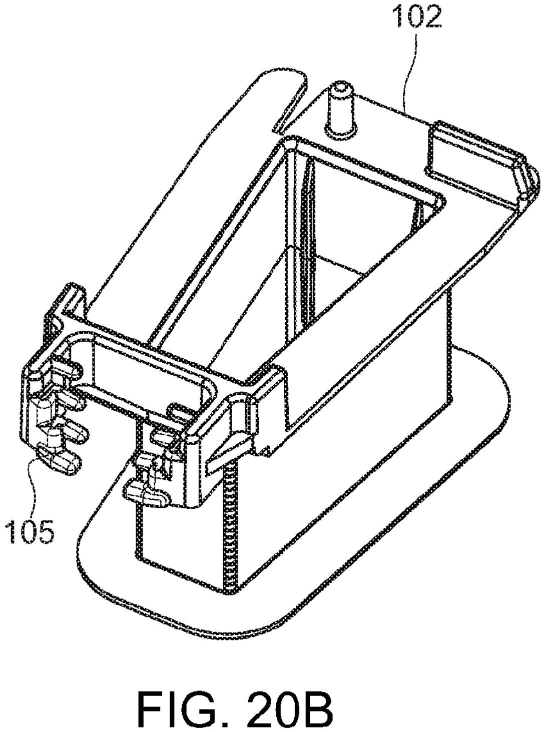
Figure 20C:
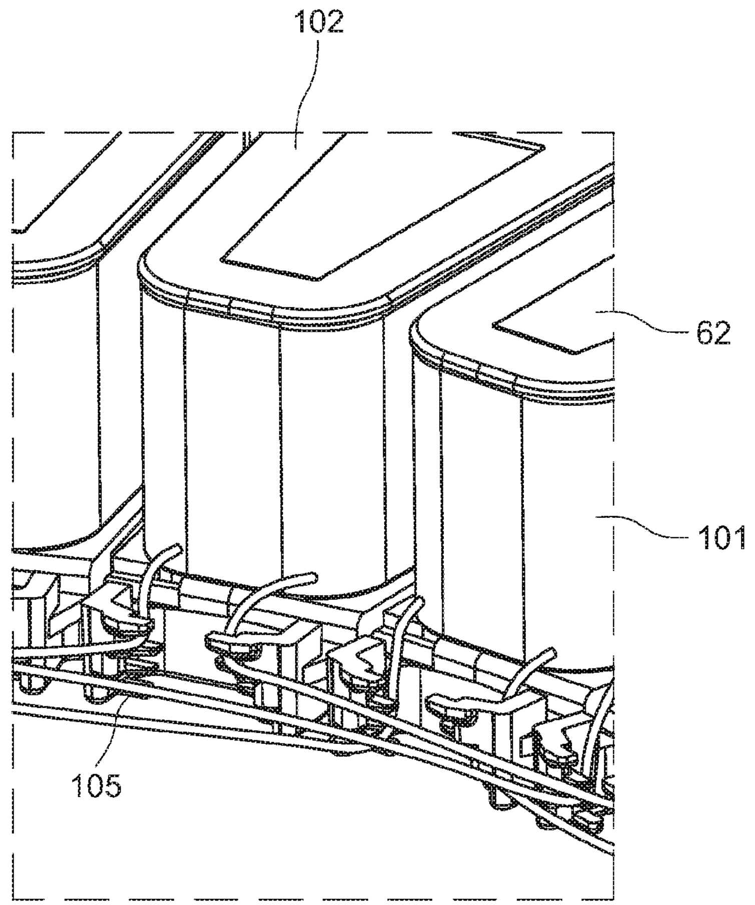

FIG. 20B shows an alternative embodiment in which the guide surface 105 is located at on the top of the bobbin 102.

FIG. 20C depicts an embodiment in which the guide surface 105 comprises a series of three stepped surfaces separated by one or more guide teeth. This is suitable for maintaining the physical separation of wires in a stator 22 wound in a three phase configuration.

The stator coil 101 may be wound onto the bobbin 102 in any suitable manner and can be electrically connected as shown in FIG. 6. Here they are wound in three phases, with each phase comprising a group of nine stator coils 101. In the embodiment shown in the Figures, the motor has three groups of 9 stator coils for a total of 27 stator coils. One group of 9 stator coils is shown in FIG. 6. This number of groups and stator coils is exemplary only. In other embodiments the stator coils may be carried by the plurality of teeth 62 in some other manner (i.e. not upon a plurality of bobbins), provided that the stator coils 101 are electrically insulated by the insulating structure. For example, the stator core 60 and teeth 62 may be plastic overmolded, and the stator coils 101 directly wound onto the teeth by a needle winding process.

When the stator coils 101 are energized, they generate magnetic poles of the stator which interact with the permanent magnetic poles of the rotor to cause to rotation. In some embodiments the ratio of the ratio of magnetic poles carried by the stator to magnetic poles carried by the rotor is 3:4. This magnetic pole ratio has been found to give good results in low vibration and noise performance of the axial flux motor. As shown in the Figures, in some embodiments the motor may have 27 stator coils and 36 magnetic poles provided by the permanent magnets of the rotor. However, that is by way of example only and should not be considered limiting. In some embodiments the number of electromagnetic symmetries of the motor is between 5 and 12 (the number of electromagnetic symmetries can be determined by finding the largest common factor between the number of rotor poles and the number of stator poles). For example, the motor may have 15 stator poles to 20 rotor poles, or 18 stator poles to 24 rotor poles, or 21 stator poles to 28 rotor poles, or 24 stator poles to 32 rotor poles, or 27 stator poles to 36 rotor poles, or 30 stator poles to 40 rotor poles, or 33 stator poles to 44 rotor poles, or 36 stator poles to 48 rotor poles. Of those options, there are embodiments where 15 stator poles to 20 rotor poles, 27 stator poles to 36 rotor poles, and 36 stator poles to 48 rotor poles are preferred.

2.2 Rotor

Figure 7:
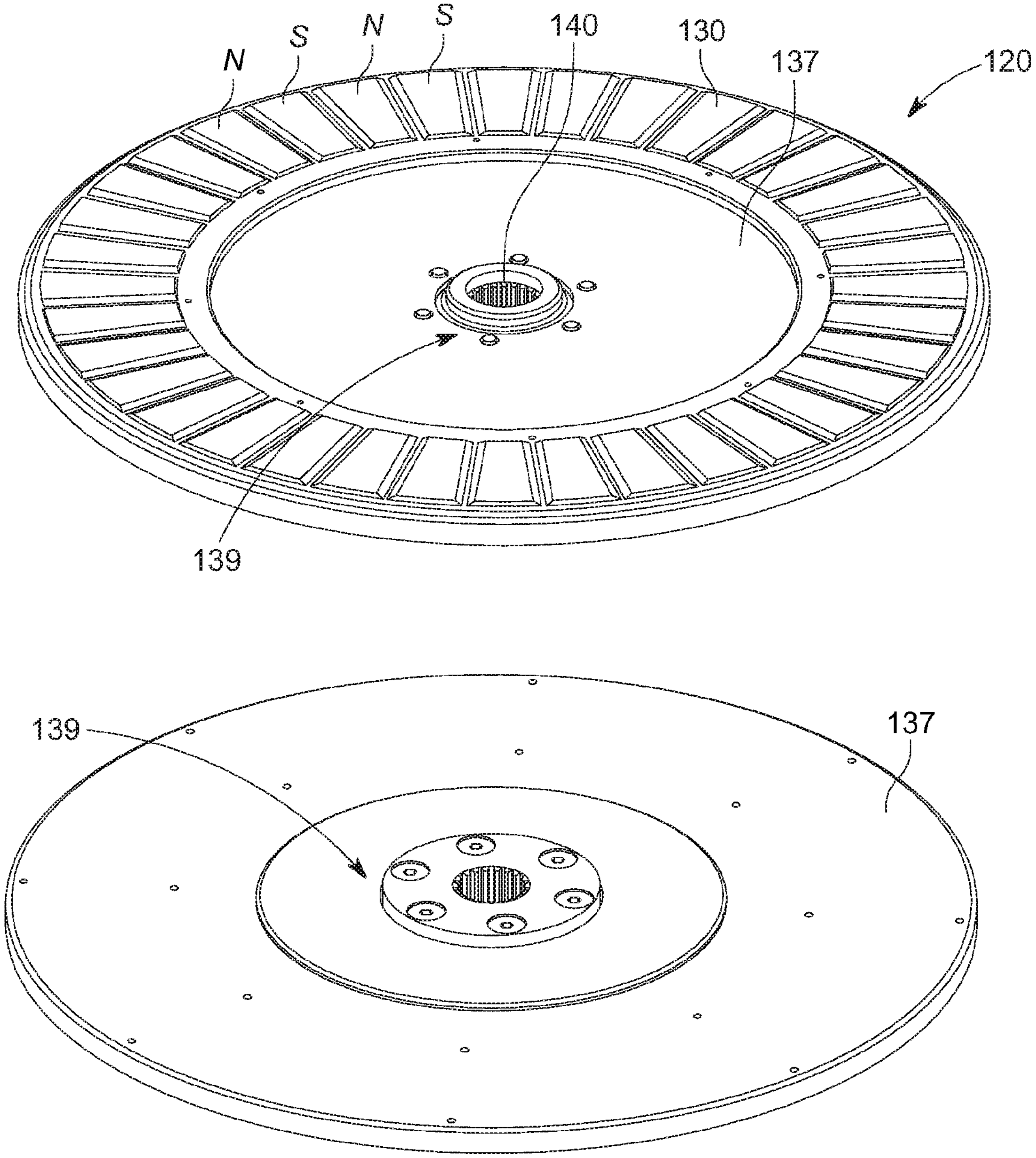
FIG. 7 shows, in isolation, various views of a rotor of the assembly shown in FIGS. 3A-3E.

FIG. 7 shows the rotor 21 in further detail.

The rotor 21 comprises a circular frame 137, an annular guide or backing ring 120 to which a plurality of permanent magnets 130 are attached, and a central hub 139 (with a knurled, toothed or splined aperture 140) for coupling to a drive shaft. The rotor frame 137 may be manufactured from steel plate or could alternatively be moulded from a plastics material such as BMC and may optionally include steel inserts for stiffness. The hub 139 may be fastened to the rotor frame 137, or, in the case of a plastics moulded rotor frame 137 the hub 139 may be insert moulded with the rotor frame 137.

Figure 8A:
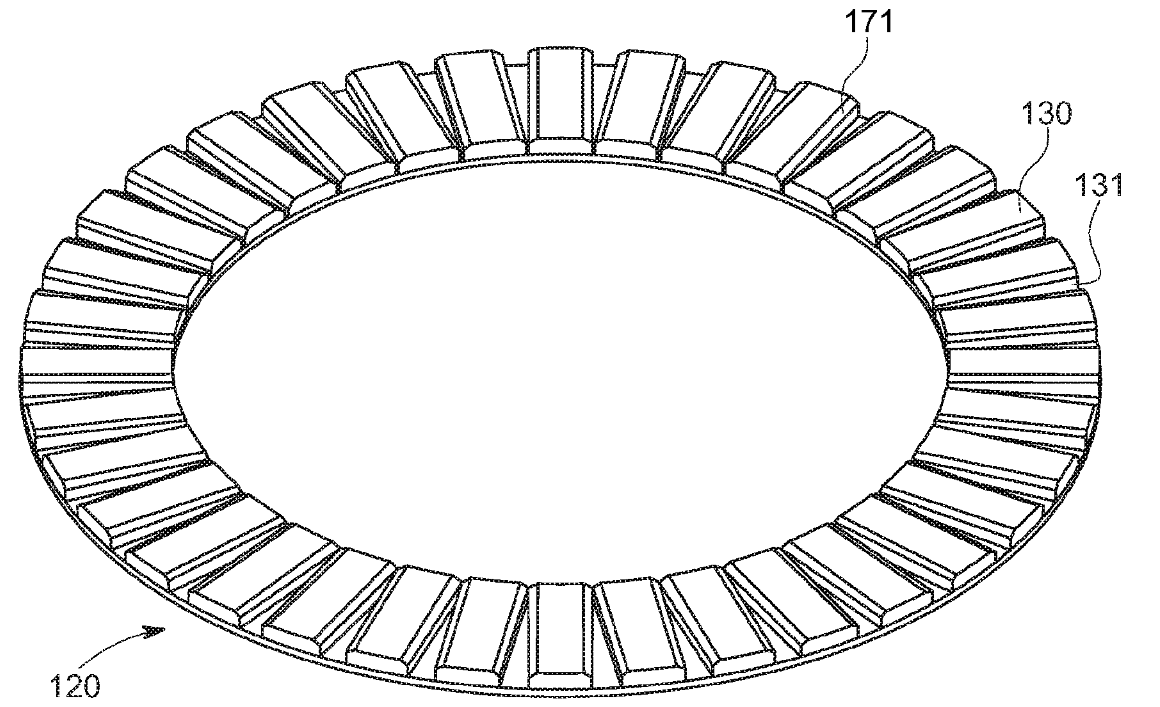
FIGS. 8A and 8B shows various views of an alternative configuration of the permanent magnetic region of the rotor shown in FIGS. 3A-3E.
Figure 8B:
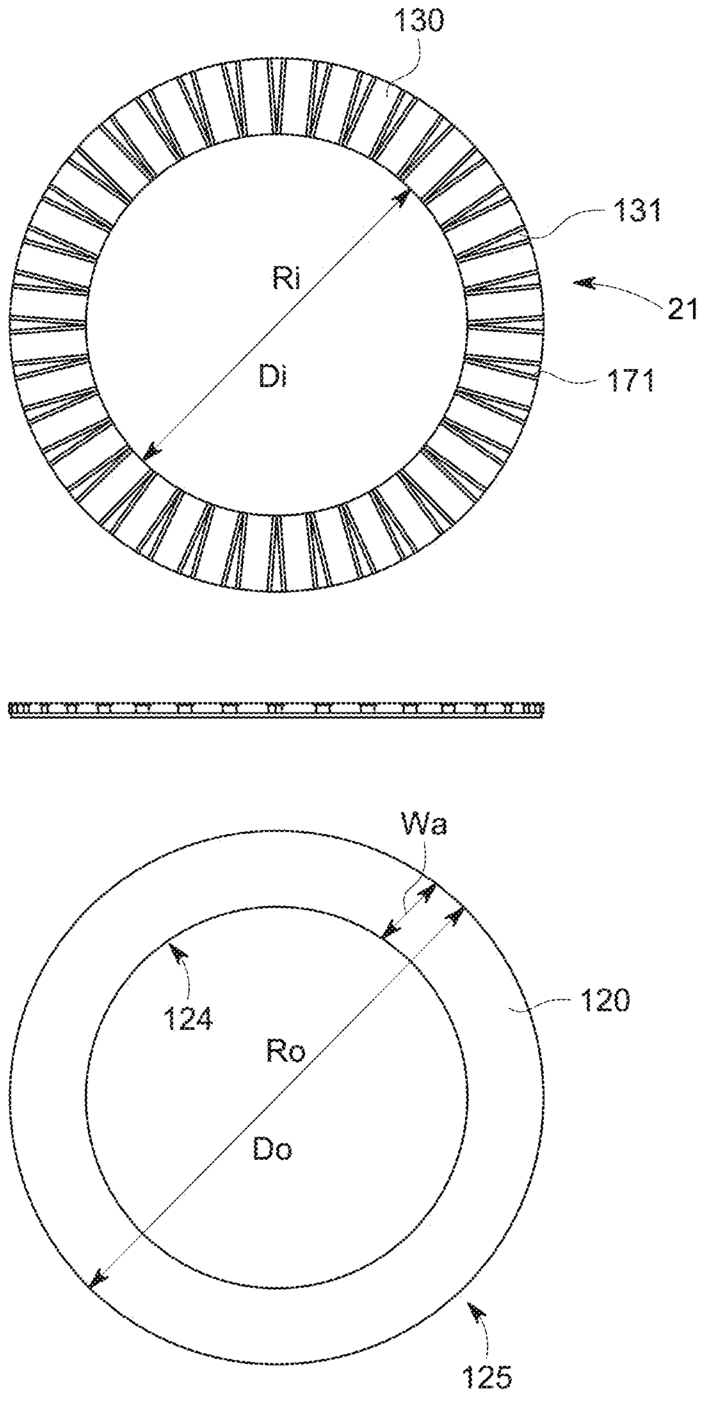
Figure 13A:
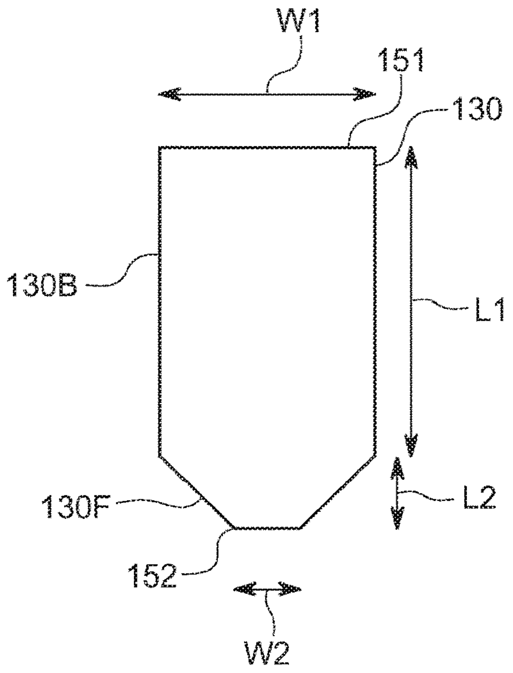
FIGS. 13A-13D show tapered magnets suitable for use on the rotor.
Figure 13B:
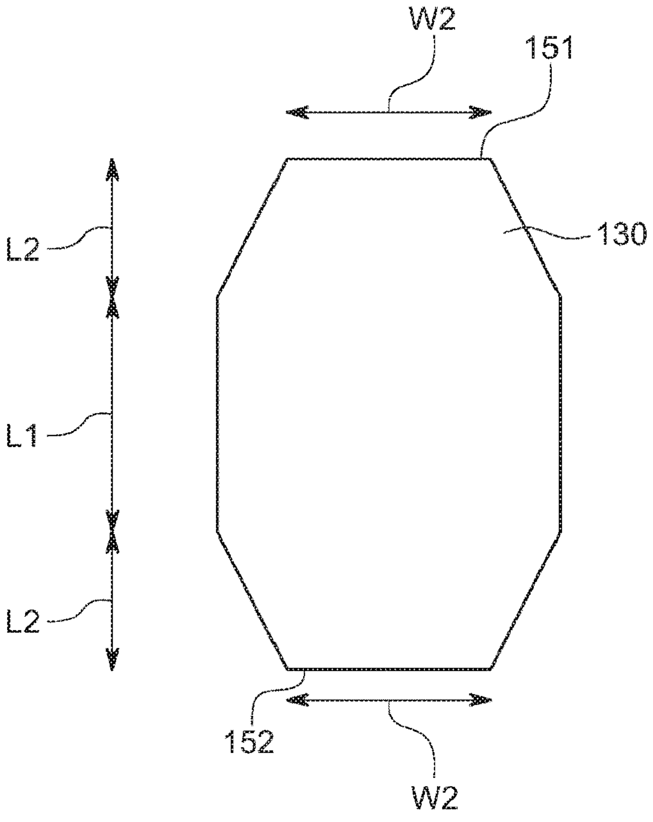
Figure 13C:
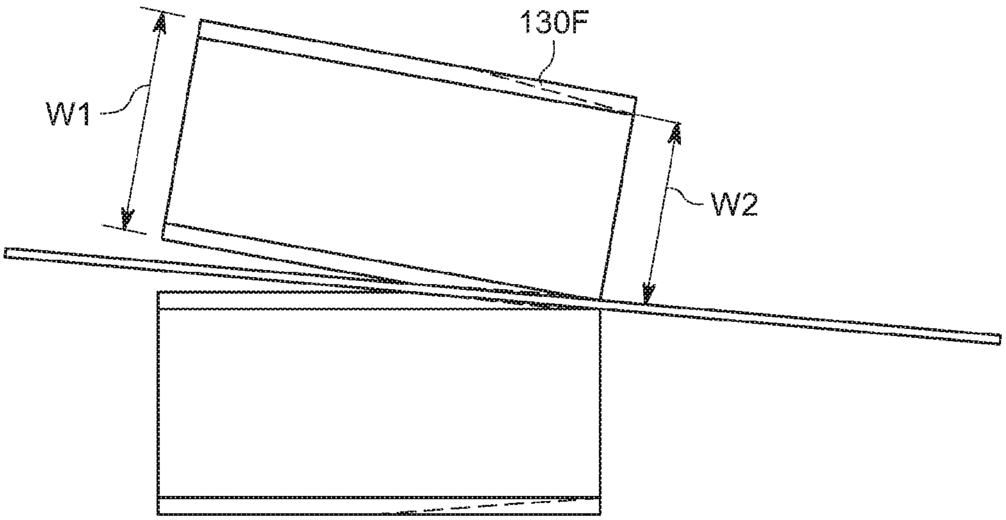

Permanent magnets 130 are disposed evenly about the circumference of the rotor to provide a plurality of alternating magnetic poles as shown in FIG. 7. In some embodiments each permanent magnet 130 is formed as a discrete piece of magnetic material, providing a single N or S magnetic pole (rather than, for example, mosaicing several magnetic pieces together to provide a single N or S pole). For example, the magnets may be between approximately 5 mm-6.5 mm thick in the axial direction, and may be made from sintered ferrite or alternatively neodymium. In the case of tapered/wedge-shaped magnets (for example as shown in FIG. 7) and the hybrid-shaped magnets (for example as shown in FIGS. 13A-13C), the permanent magnets may be positioned adjacent one another to cover substantially an entire annular region of the backing ring 120. Whereas in the case of rectangular magnets (for example as shown in FIGS. 8A and 8B), the magnets may be laid about an annular region of the backing ring 120 such that there is a gap 131 defined between adjacent magnets through which the backing ring 120 is exposed. The magnets 130 may have a chamfer 171 along the side edges which extend in the radial direction. The chamfers 171 on the magnets 130 may allow the motor to have low cogging, which reduces the vibration and consequently the noise.

The magnets 130 may be glued or otherwise attached to the backing ring 120 (for example as seen in FIG. 8A) and/or retained in place by guides (for example as seen in FIG. 7). The rotor magnet backing ring 120 has an inner diameter Di/radius Ri forming an inner perimeter 124. The backing ring 120 also has an outer diameter Do/radius Ro forming an outer perimeter 125. The r backing ring 120 has an annular width Wa, which is the difference between the outer radius Ro and the inner radius Ri. There is also a rotor mean radial/Diameter length Rm/Dm, which is the radius/diameter to the midpoint of the width of the backing ring. The backing ring 120 has a yoke thickness Ty (which can be better seen in FIG. 8B).

In some embodiments the permanent magnets 130 are arranged about an annular region of the rotor 21 (for example overlying an annular backing ring 120), with the inner and outer diameter of the magnetic region (for example Di and Do in FIG. 8B) being equal to the inner and outer diameter of the annular stator core (for example Di and Do in FIG. 4C). In this case, the annular width Wa of the magnetic region is equal with the annular width Wa of the core. However in some embodiments the inner and outer diameter of the magnetic region is not equal to the inner and diameter of the annular stator core, and/or the annular width Wa of the magnetic region is not equal to the annular width Wa of the core. For example, in the embodiment shown in FIG. 3E, it can be seen that the permanent magnets 130 overhang the core 60 by some distance, so that the annular width Wa of the magnetic region is greater than the annular width Wa of the core. Surprisingly it has been found that the annular width Wa of the core 60 may be up to about 10 mm less than the annular width Wa of the magnetic region without any significant loss in performance (compared to when the annular width of the magnetic region and core is equal).

2.3 Stator and Rotor Configuration

Figure 3A:
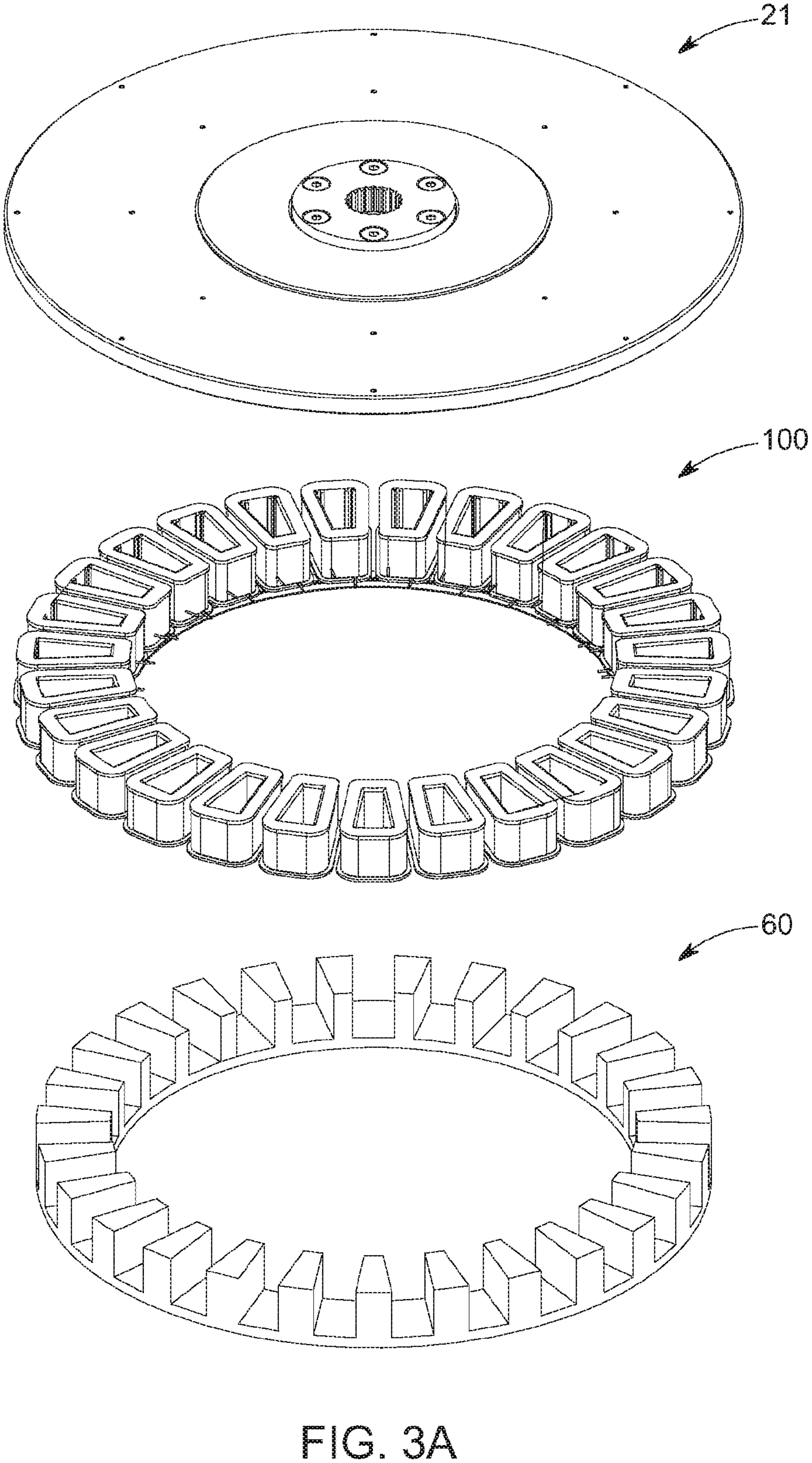
FIG. 3A shows an exploded view of a rotor, stator core and insulating structure according to one embodiment of an axial flux motor.
Figure 3B:
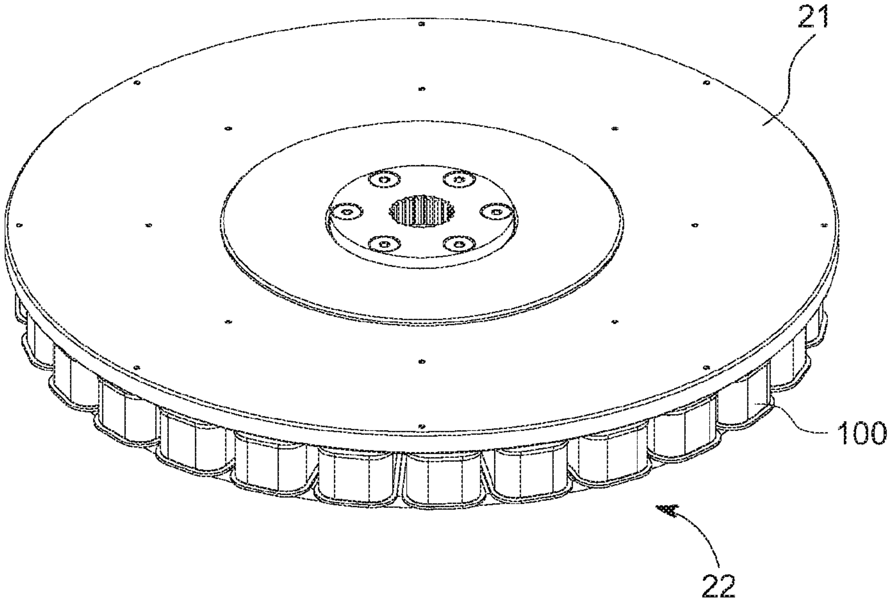
FIGS. 3B and 3C show the rotor, stator core and insulating structure of FIG. 3A in assembly.
Figure 3C:
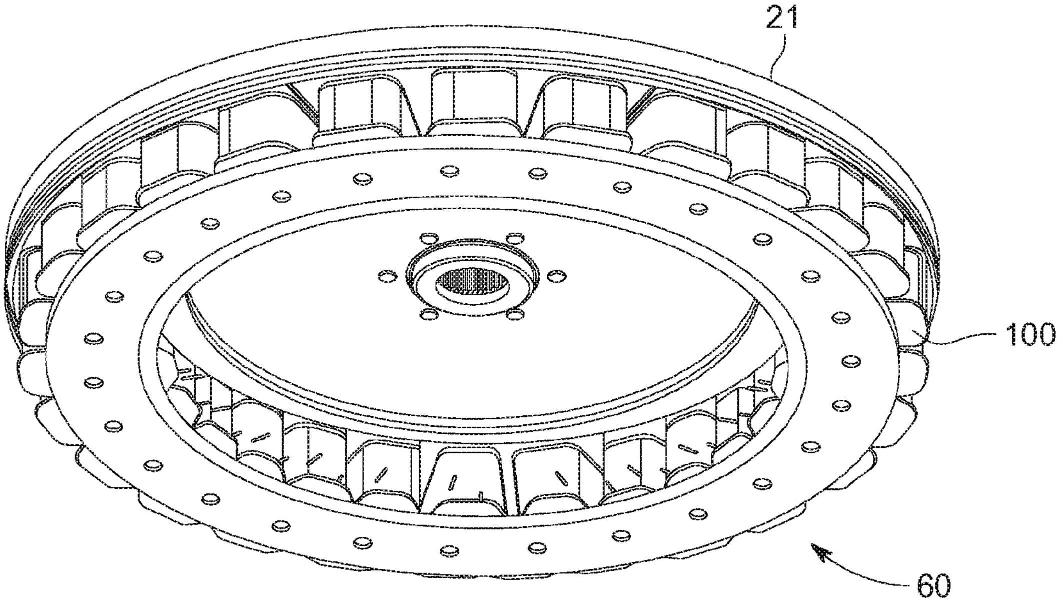
Figure 3D:
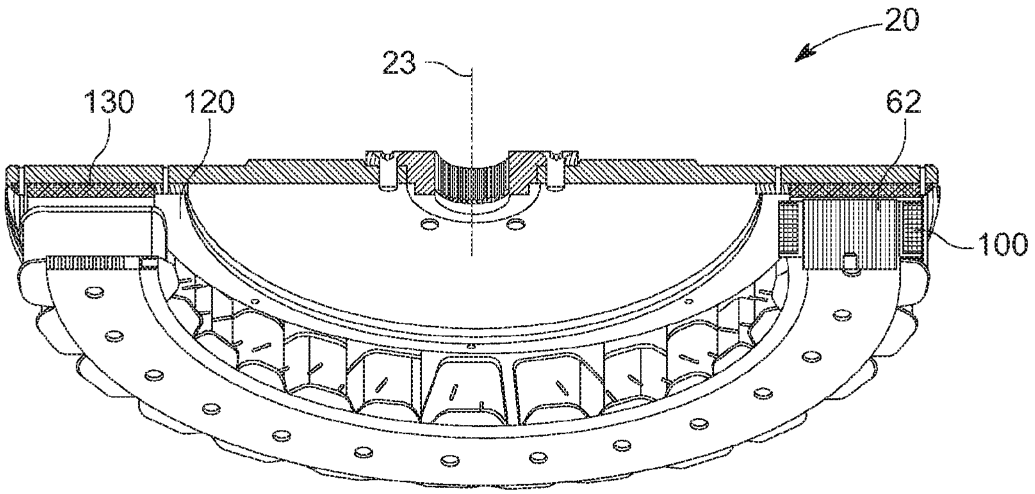
FIG. 3D shows a cross sectional view through the assembly of FIG. 3C.
Figure 3E:
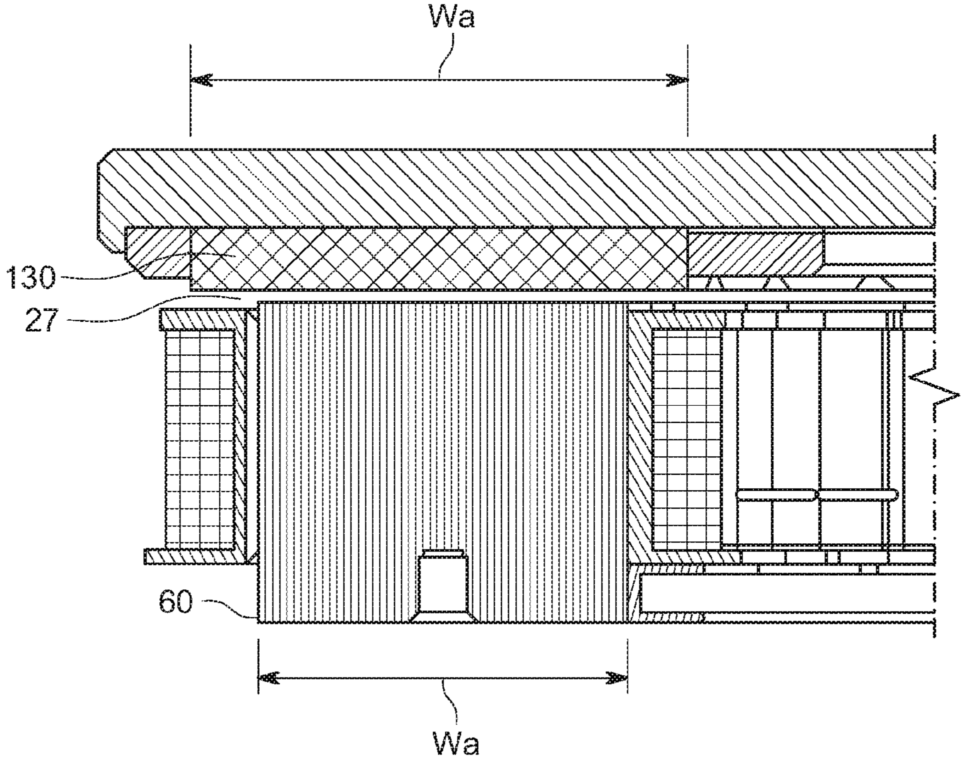
FIG. 3E shows a partial detail view of the cross section shown in FIG. 3D.

Referring to FIGS. 3D and 3E: the stator 22 and rotor 21 are mounted concentrically along a common axis 23, and able to rotate relative to one another. The stator coils (101, not shown) are energized sequentially to generate magnetic fields, and the interaction of those magnetic fields with the permanent magnets 130 carried by the rotor causes rotation. A machine controller and/or motor controller can provide appropriate commutation signals to the stator coils so that the rotor's rotational speed and direction may be dictated during the various cycles of a user-set wash programme of the machine.

The rotor 21 and stator 22 are spaced relative to one another along the common axis 23, defining an air gap 27 between them, so that the magnetic flux path between the rotor magnets 130 and stator coils 101 is oriented in the axial direction. In some embodiments the air gap is between about 0.2 mm and 1.8 mm the axial direction. In some embodiments the air gap is between about 0.4 and 1.5 mm. In some embodiments the air gap is between 0.9 and 1.1 mm. In some embodiments the air gap is approximately 1.2 mm. The air gap may vary during operation of the motor, although it is desirable to maintain the air gap at a constant distance as far as possible. The motor performance and behaviour can change if the air gap varies too far outside of its specified range, therefore optimised assembly and careful tolerancing of part dimensions are needed to give acceptable control over the size of the air gap.

Some axial flux motors have a double rotor configuration, wherein there is a rotor axially spaced on either side of the stator, each rotor carrying its own plurality of permanent magnets. Conversely it can be possible to have a dual stator configuration, wherein there is a stator axially spaced on either side of a single rotor. However, in preferred embodiments of the present invention the axial flux motor is of single rotor configuration, i.e. it has only one rotor that is axially spaced from, and magnetically interacts, with only a single stator. In some embodiments, the overall height of the motor in the axial direction, with the rotor and stator concentrically mounted to define an air gap between them, is about 45 mm or less.

3. Example Embodiments

Various features of the embodiment above will now be described in further detail, each resulting in a variation or embodiment in its own right.

Each of the features described here in could be combined with any of the other features. For example any variation of the stator core could be provided with any variation of the rotor which could be provided with any variation of the magnets.

3.1 Tapered, Rectangular or Hybrid-Shaped Rotor Magnets

Figure 9:
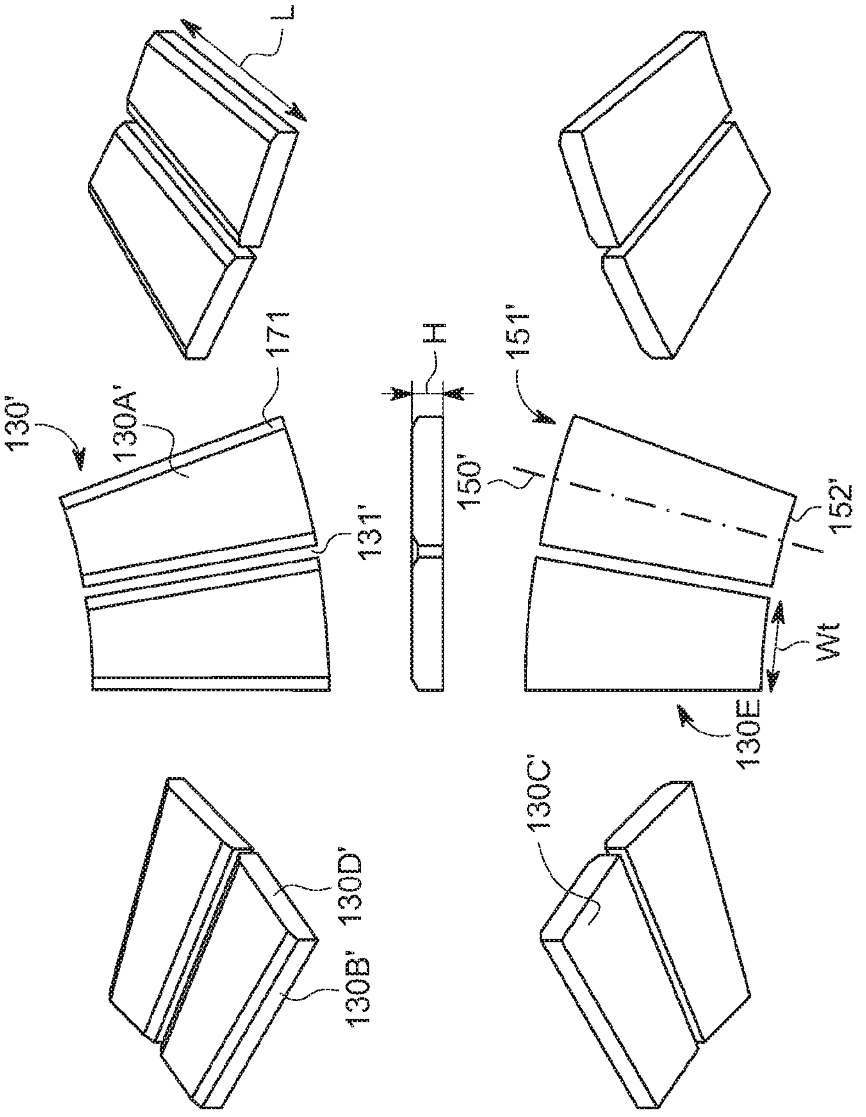
FIG. 9 shows tapered magnets suitable for use on the rotor.

FIG. 9 shows one embodiment of a possible tapered rotor magnet 130' that could be used in the rotor as described above or any other rotor described herein. The rotor magnet 130', that is tapered/wedge shaped. As can be seen, each magnet 130' has a length L and height H, but the width changes Wb, Wt so the magnet is tapered (at an angle relative to a datum) to form a wedge/triangular cross-section profile extending from a base 151' (width=Wb) on the outer perimeter of the rotor ring to a tip 152' (width=Wt) on the inner perimeter of the rotor ring 120. The base and tip can be curved commensurate with the curvature of the outer and inner perimeters of the rotor ring. The datum 150' from which the angle is measured can be a midline through the magnet 130' between the base 151' and the tip 152'. The width Wb of the base is longer than the width Wt of the tip. The magnet 130' has a top surface 130A', side wall 130B', a bottom surface 130C' and ends 130D'. The long edge 130E' of the magnet is chamfered 171 where the top lengthwise edge 130E' meets the side wall 130B' of the magnet 130'.

To provide maximal area of permanent magnetic material about the rotor (and hence maximal strength of the magnetic field), the magnets may be made with a tapered shape as described above and positioned adjacent one another to cover substantially an entire annular region of the rotor 21.

For some types of magnetic material it may be possible to mould the material to the desired tapered shape. Alternatively, a conventionally shaped piece of magnetic material (for example a sintered rectangular magnet) could be ground along its edges to achieve a tapered shape. The grinding process may typically require numerous different stages, and manual processing, in order to grind all of the different edge angles and chamfers; and thus can be relatively complex and expensive.

Figure 10:
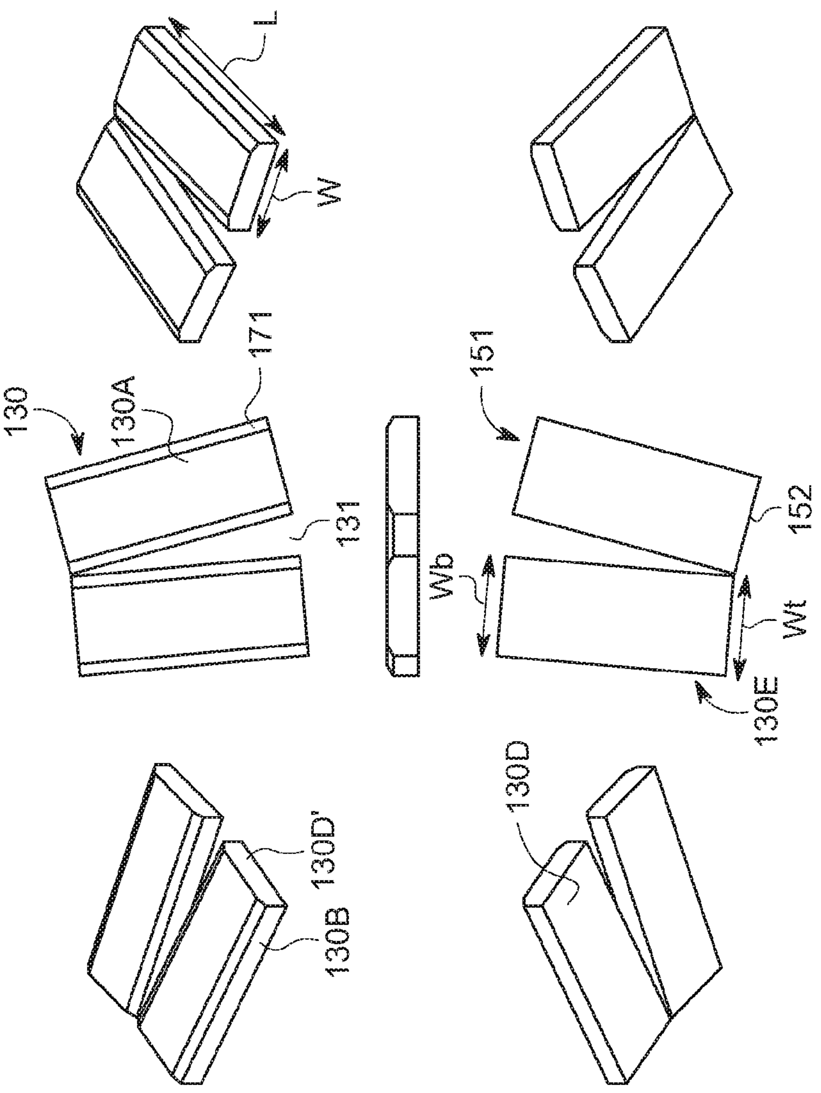
FIG. 10 shows rectangular magnets suitable for use on the rotor.

However, it has surprisingly been found that a substantially equivalent torque, efficiency and cogging performance can be achieved without using tapered magnets to cover substantially an entire annular region of the rotor 21. So in a variation, as seen in FIG. 10, magnets (preferably ferrite) 130 with a rectangular periphery can be used rather than tapered magnets 130'. Referring to FIGS. 8A, 8B and 10, the rectangular magnets 130 can be arranged about the annular region of the rotor 21 with their longitudinal axes 150 aligned to the radial direction. Preferably the magnets 130 are laid with a first end 152, being that end closest to the inner perimeter of the rotor, adjacent the first end 152 of a neighbouring magnet 130. Thus there are gaps 131 between magnets 130, which leave portions of the annular region uncovered by magnetic material. Sintered ferrite magnets are readily available in rectangular shape. Rectangular magnets (when compared with tapered magnets) can be more cost-effectively manufactured to accurate tolerances using conventional grinding processes, and with less process complexity and cost.

FIG. 10 shows one embodiment of a possible rectangular rotor magnet 130 that could be used with the rotor as described above or any other rotor described herein. The rotor magnet 130 comprises a generally rectangular magnet formed of any suitable material, for example ferrite. The magnet has a length L, width W and height H. The width is constant so Wb=Wb. The magnet 130 has a top surface 130A, side wall 130B, a bottom surface 130C and ends 130D. The base 151 and tip 152 can be curved commensurate with the curvature of the outer and inner perimeters of the rotor ring, or may alternatively be straight and perpendicular to the length L direction. The long edge 130E of the magnet 130 is chamfered 171 where the top lengthwise edge 130E meets the side wall 130B of the magnet 130. The chamfer 171 is as described previously.

Figure 11A:
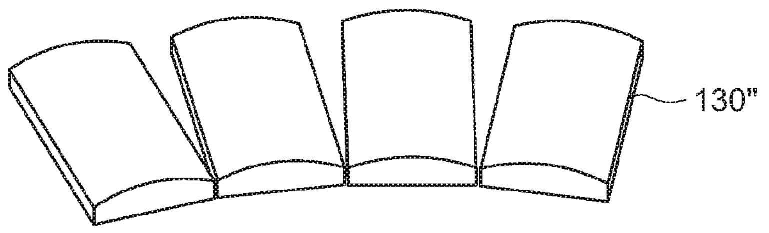
FIGS. 11A, 11B show bread loaf shaped magnets suitable for use on the rotor, and their arrangement with respect to the stator core.
Figure 11B:
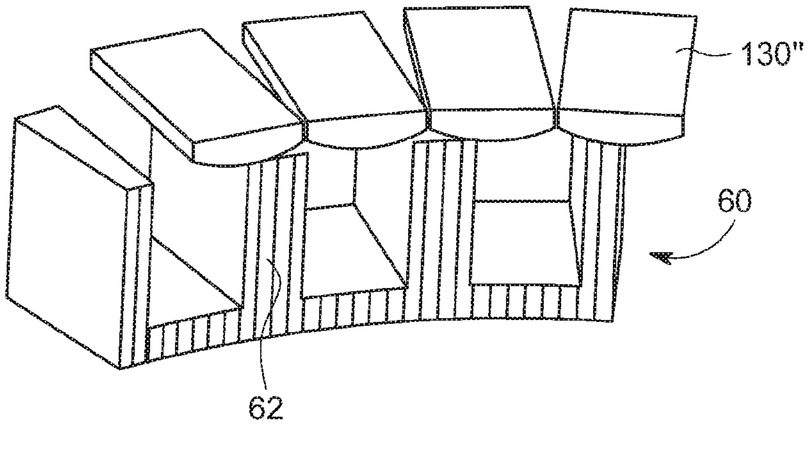

The rectangular magnets 130 may be of a uniform thickness (as above), or alternatively (referring to FIG. 11A), may have an increased thickness proximate to the central longitudinal axis, forming a "bread loaf" shape 130" where the top surface 130A is curved. As shown in FIG. 11B, the magnets 130 may be oriented such that curved surface 130A faces the upper surface of the teeth 62 of the stator core 60.

FIG. 13A is a diagrammatic representation of one embodiment of a possible rotor magnet 130 that could be used with the rotor as described above or any other rotor described herein. The rotor magnet 130 comprises a generally rectangular magnet formed of any suitable material, for example ferrite. The magnet 130 has a hybrid shape comprising a generally rectangular portion of length L1, height H1 (not shown) and width W1 similar to the magnets 130 depicted in FIG. 10 in which the sides walls 130B are parallel. The magnets 130 also have a tapered portion of length L2, height H1 (not shown) and width W2 similar to the magnets 130 depicted in FIG. 9 in which the side walls 130F are angled together towards the tip 152 closest to the inner perimeter of the rotor 124. The tip 152 is depicted as straight and perpendicular to the length L direction, but may otherwise be curved commensurate with the curvature of the inner perimeter 124 of the rotor ring 120. In some embodiments the length L2 of the tapered portion does not extend more than half of the overall length (L1+L2 in FIG. 13A) of the magnet, and preferably not more than a third, or a quarter of the overall length.

FIG. 13B shows an alternative embodiment of a possible rotor magnet 130 in which a tapered portion is provided at both the base 151 and tip 152, providing a magnet 130 in the form of an octagonal prism. Whilst depicted as having the same width W2 and length L2, the two tapered portions may be independently dimensioned.

Figure 13D:
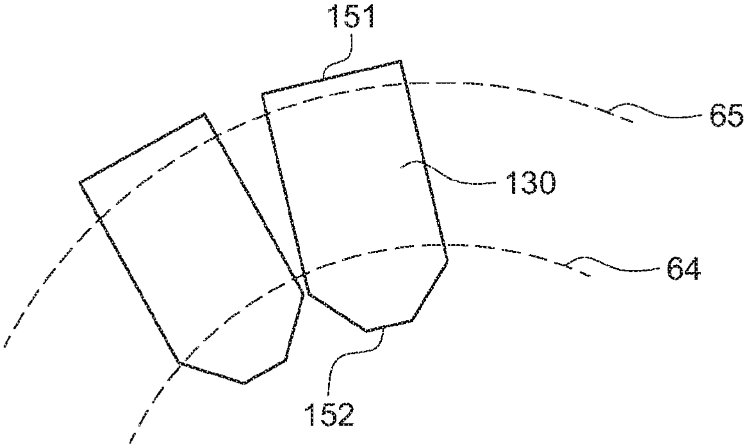

FIG. 13D shows the arrangement of two neighboring magnets 130 of FIG. 13A. As can be seen, the tapered magnets may be positioned closer together without overlapping at the inner perimeter 124 of the magnetic region or impinging on the minimum magnet clearance, increasing the magnetic surface area of the magnetic region.

FIG. 13C shows the magnets 130 of FIG. 13A arranged around a segment of the rotor ring 120 relative to the annular stator core 60, wherein the tapered regions at the tip 152 overhang the magnetic region of the rotor (i.e. lies outside the footprint of the annular stator core 60). An advantageous result of this arrangement is that the tapered portion of the magnet 130 doesn't interact with the stator core to the same extent as the regions of the magnet directly above the stator teeth (i.e. the rectangular portion). As a result, small variations in the shape of the tapered region do not have a significant adverse impact on motor performance, e.g. cogging, such that accurate grinding of the tapered edge profile is not required.

The hybrid shaped magnets of FIGS. 13A and 13B thus increase the maximum magnetic surface area of the stator 22 without overly increasing the complexity and cost of the manufacturing process.

Figure 14:
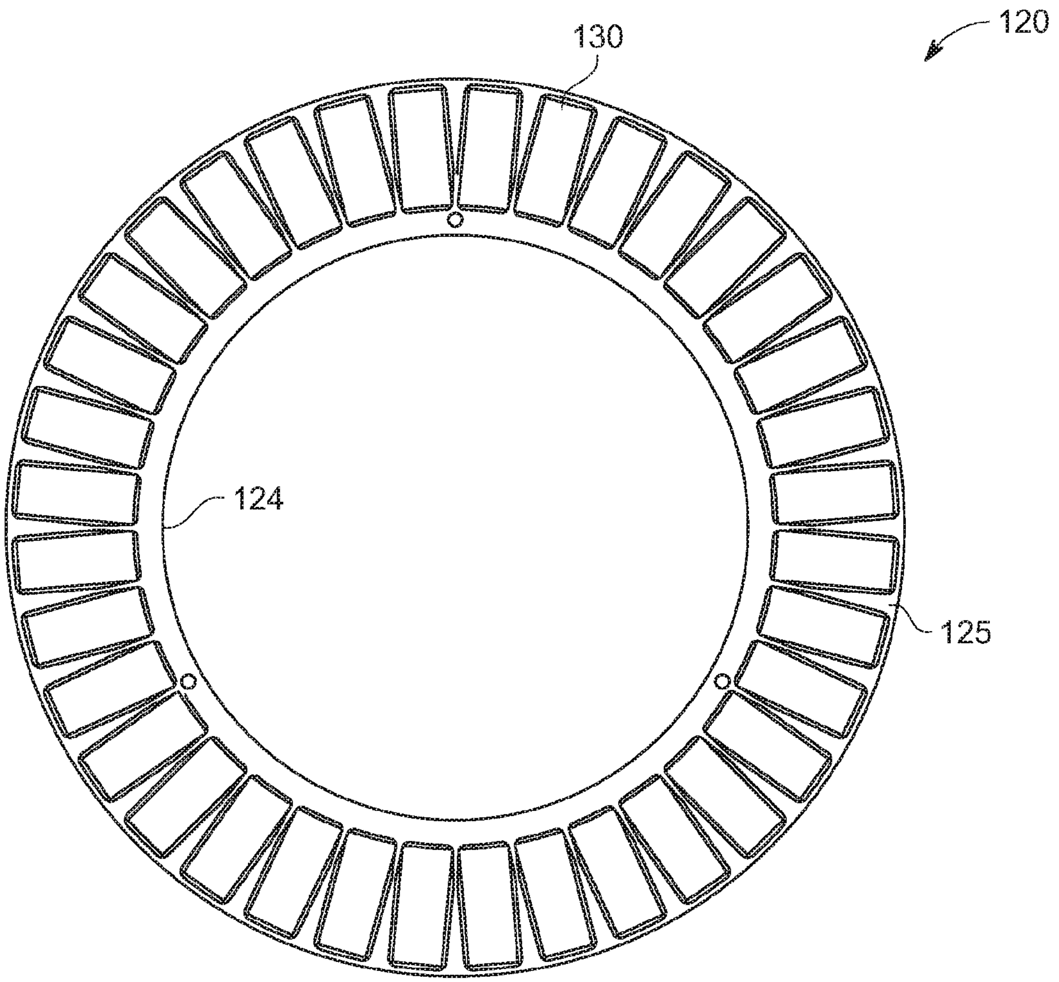
FIG. 14 shows a view of an alternative configuration of the permanent magnetic region of the rotor according to an embodiment of the invention.

FIG. 14 shows the arrangement of the magnets 130 of FIG. 13A around the entire rotor ring 120.As with the embodiment described above in relation to FIGS. 9-11, the magnets 130 of FIGS. 13A-13C may have uniform thickness, be otherwise "bread loaf shaped" or have any other cross-section as required. Any one or more of the top edges of the magnets 130 may be chamfered.

3.1 Moulded Rotor

FIGS. 15A-D depicts an embodiment in which the rotor frame 137 is formed of a molded polymeric material such as BMC, and the central hub 139 is formed of steel and is insert molded into the polymeric material of the rotor frame 137.

In an embodiment the backing ring 120 of the rotor 21 is also formed of steel and is moulded into the frame. In an alternative embodiment, the central hub 139 is formed of the same polymeric material as the rotor frame 137 such that the rotor assembly is unitary.

Figure 15A:
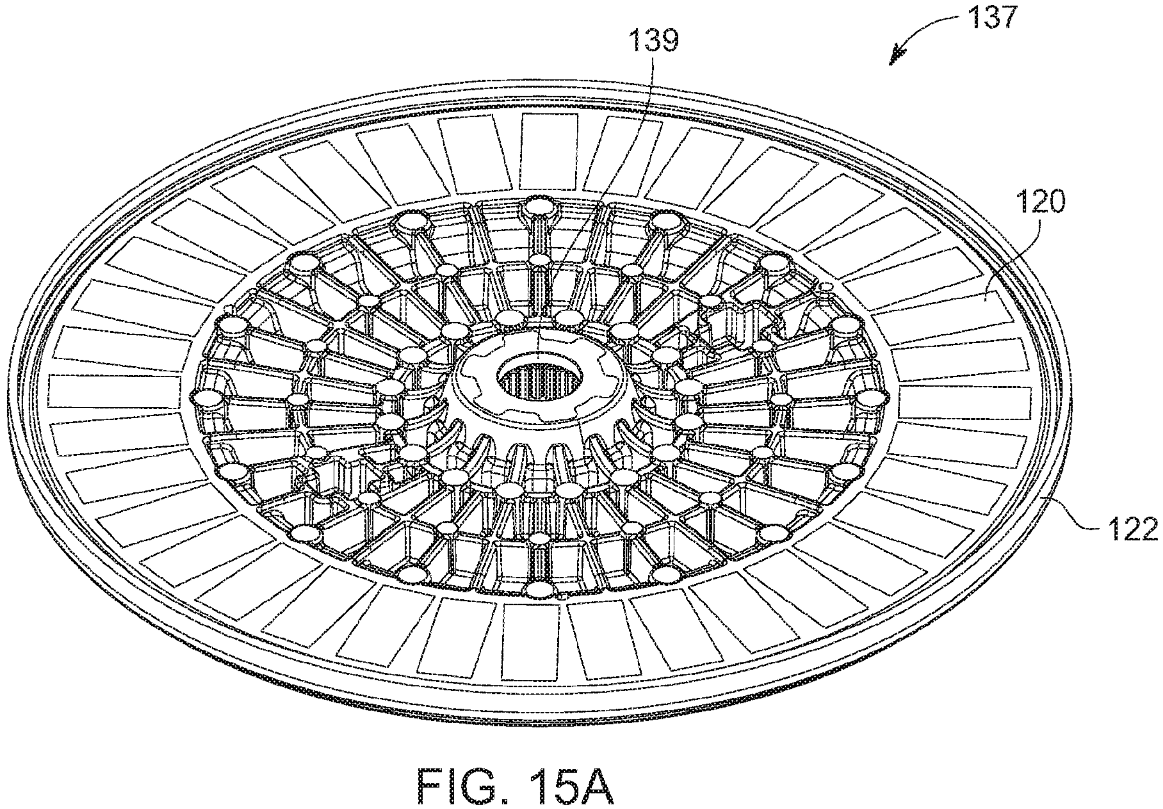
FIGS. 15A-15E show various views of an alternative configuration of the rotor.
Figure 15B:
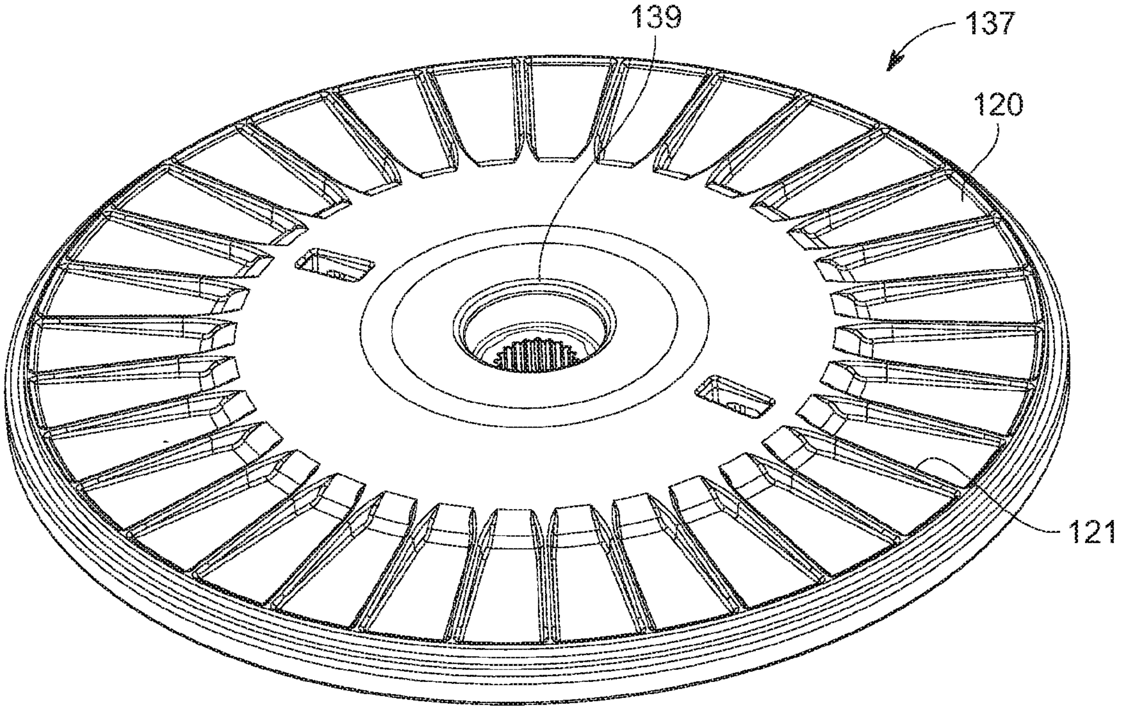
Figure 15C:
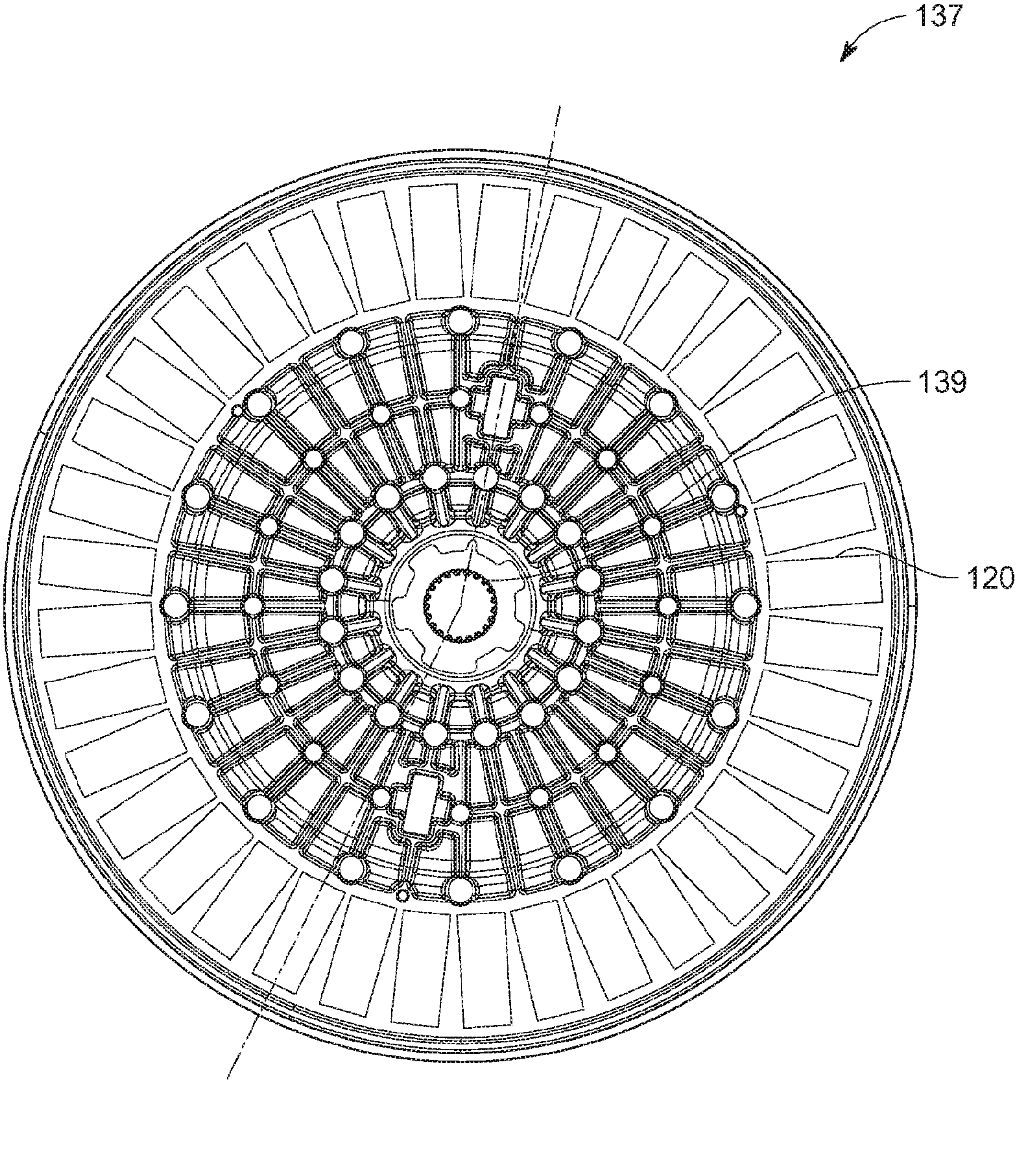
Figure 15D:
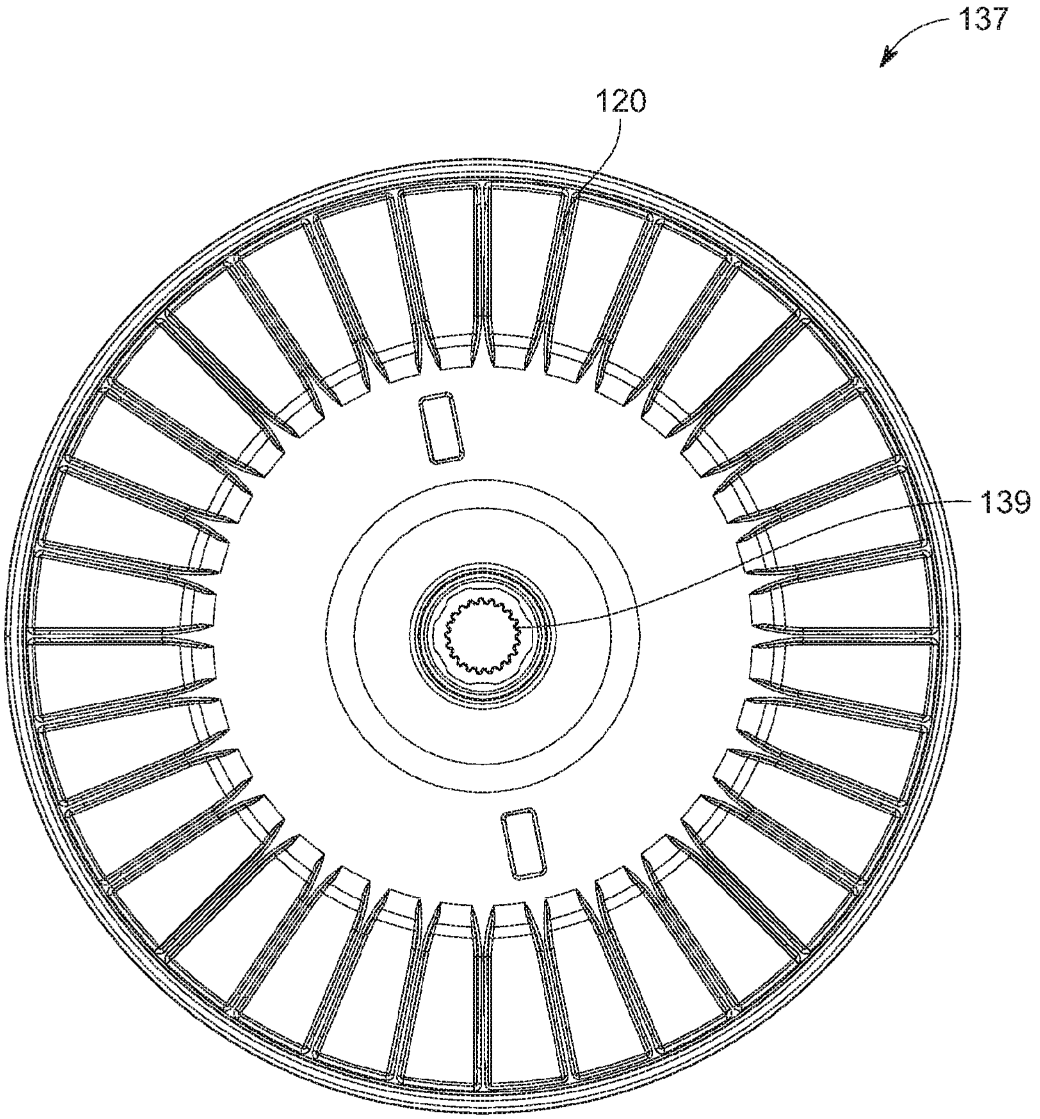
Figure 15E:
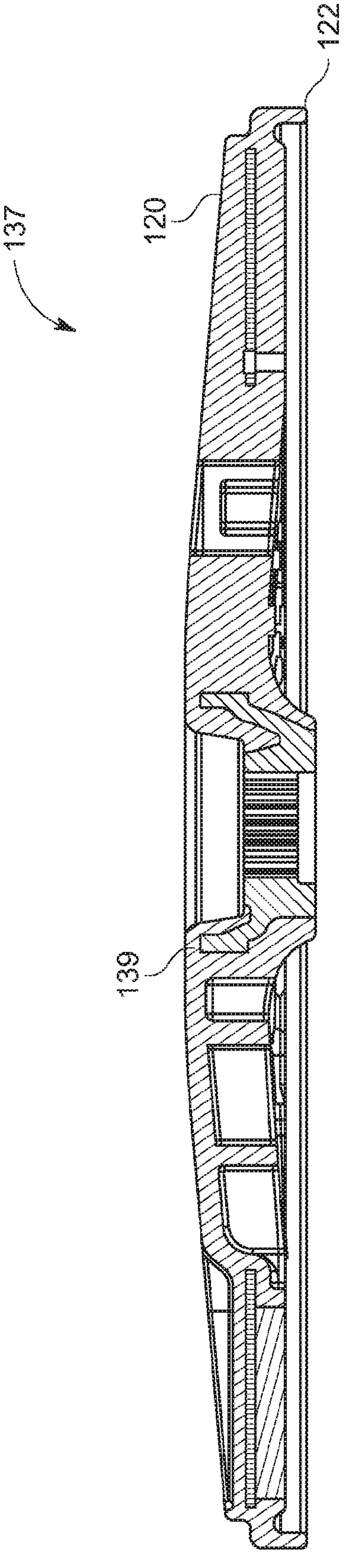

As shown in FIG. 15E, the rotor frame 137 may have a profile wherein the height or thickness of the rotor frame 137 is greatest in a central region at or near the central hub 139, and decreases at or towards an annular region concentric with the annular region the backing ring 120.

As shown in FIG. 15A, the rotor frame 137 may include a substantially hollow reinforced region about the central hub 139. In an embodiment, the reinforced region includes a network of radially and/or circumferentially extending ribs. The rotor frame may further include a lip 122 about the exterior of the annular region as shown in FIGS. 15A and 15E.

As shown in FIG. 15B, the annular region of the rotor frame 137 includes radially extending legs or ribs 121.

Such features provide for a rotor 21 with sufficient rigidity to avoid excessive vibration, and may help maintain the desired air gap between the rotor 21 and stator 22 during operation.

3.2 Stator Fastening Portion

FIGS. 16A-16D and 21 depict an embodiment in which the stator 22 includes an integral fastening portion 22A which attaches the stator 22 to the washing machine. This is an alternative to the embodiment depicted in FIG. 2 in which the fastening portion 22A is provided as a separate element between the stator 22 and the washing machine body (for example that of FIGS. 17A and B).

Figure 16A:
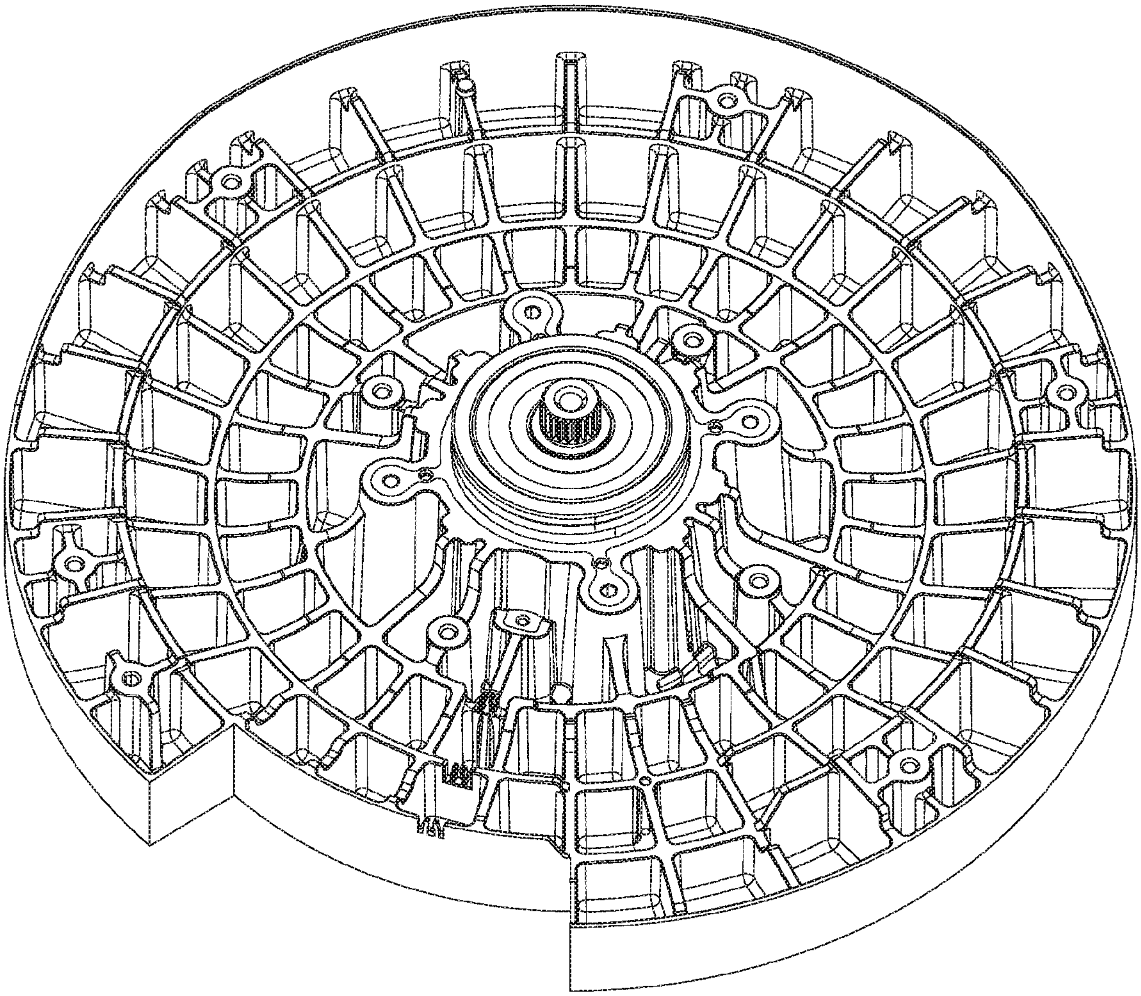
FIGS. 16A-16F show the arrangement of the fastening portion and stator according to an embodiment of the invention.
Figure 16B:
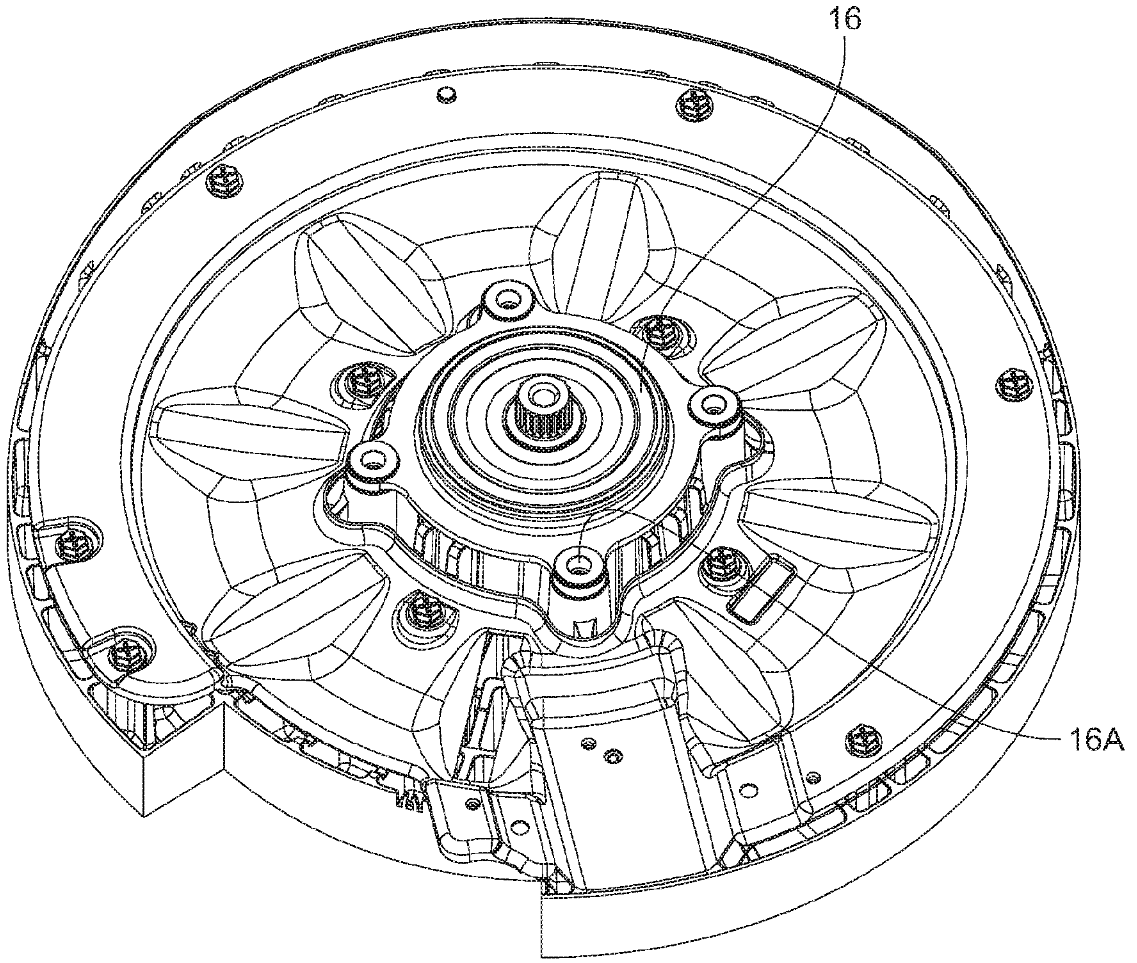
Figure 21:
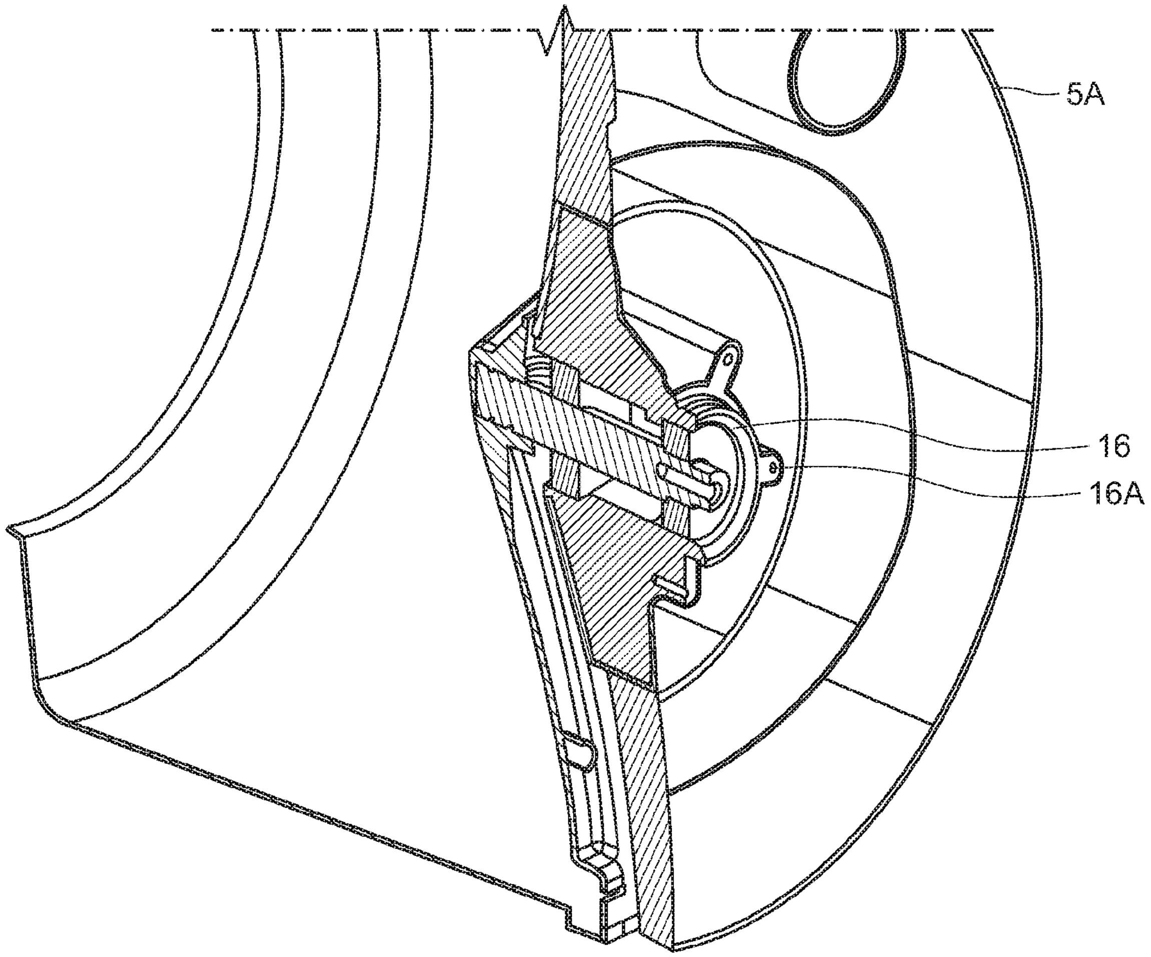
FIG. 21 shows a cross-sectional view of the tub rear according to an embodiment of the invention.

FIG. 16A shows a polymeric rear or end wall 5A of the outer tub 5, and the end the bearing housing 16 with mounting holes 16A for mounting the motor with fasteners or the like. An alternative view is shown in FIG. 21, which shows the metallic bearing housing 16 protruding through the tub rear. FIG. 16B shows a heatshield on the exterior of the tub between the polymeric end wall 5A and the motor.

In some embodiments the fastening portion 22A may be configured to attach the stator 22 directly to the bearing housing structure 16 of the washing machine via the mounting holes 16A, or to some supporting structure extending outwardly from the bearing housing 16—such as a radially depending metallic support, frame or shroud (not shown) located about the central bearing housing 16. In some embodiments the fastening portion 22A may be configured to attach the stator 22 directly to a rear of an outer drum 5 of the washing machine.

Figure 16C:
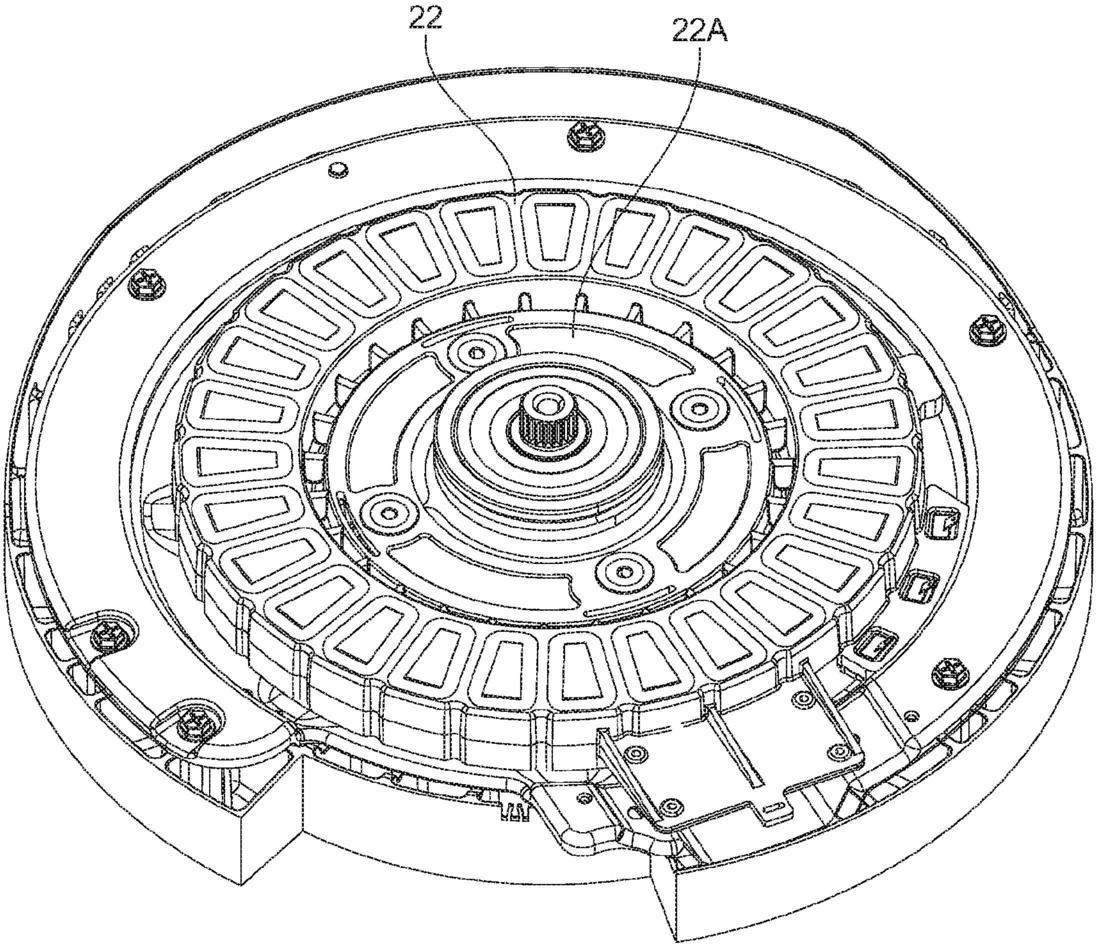

In an embodiment the fastening portion 22A may be configured to receive fasteners (preferably between 3 and 6, and more preferably between 4 and 5) for attaching the stator 22 to the washing machine. For example, as shown in FIG. 16C, the fastening portion 22A may be in the form of an inner annular region extending radially inward of the annular stator core 60, said region providing apertures for receiving fasteners such as bolts or screws collocated with the mounting holes 16A on the underlying bearing housing 16. In a further embodiment, the fastening portion 22A includes outer annular region extending radially outward from the annular stator core 60 in addition to or instead of the inner annular region in order to attach to a support structure radially depending from the bearing housing 16. In an embodiment, the apertures of the inner annular region are arranged about a pitch circle having a pitch diameter between 120-140 mm or more preferably between 126-134 mm. In some embodiments, one or both of the inner and outer annular regions are formed of steel. In some embodiments the fastening portion 22A is formed at least in part from an overmoulded polymeric material, such as BMC.

Figure 16D:
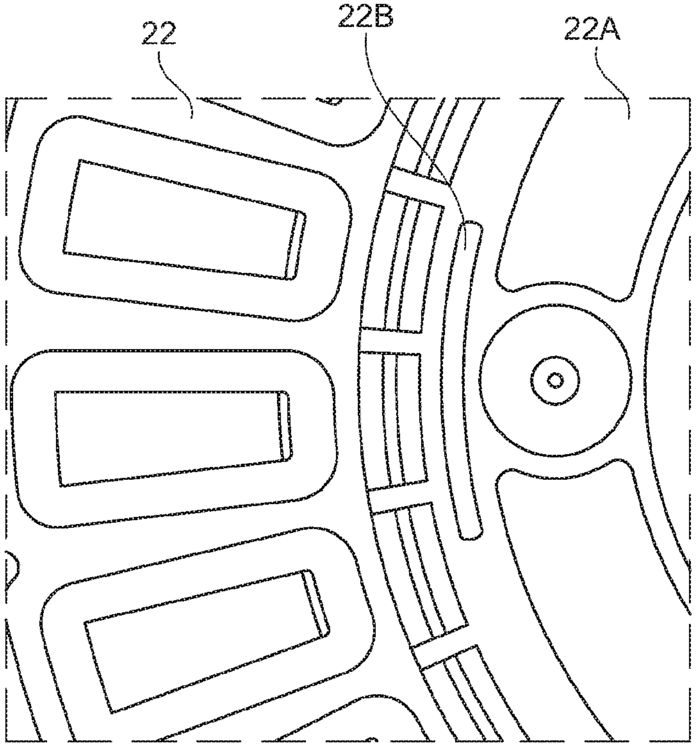

As shown in FIG. 16D, the fastening portion 22A comprises one or more attenuating features 22B in the form of circumferentially extending slots located (for example) between the inner perimeter 64 of the stator core 60 and the fastening apertures. This allows the rigidity of the fastening portion to be adjusted so as to improve the attenuation of vibrations from the stator 22. In some embodiments the fastening portion 22A includes additional attenuating features 22B in the form of apertures, ribs and/or reinforced regions aimed at absorbing vibrations (caused by torque ripple, for example).

Figure 16E:
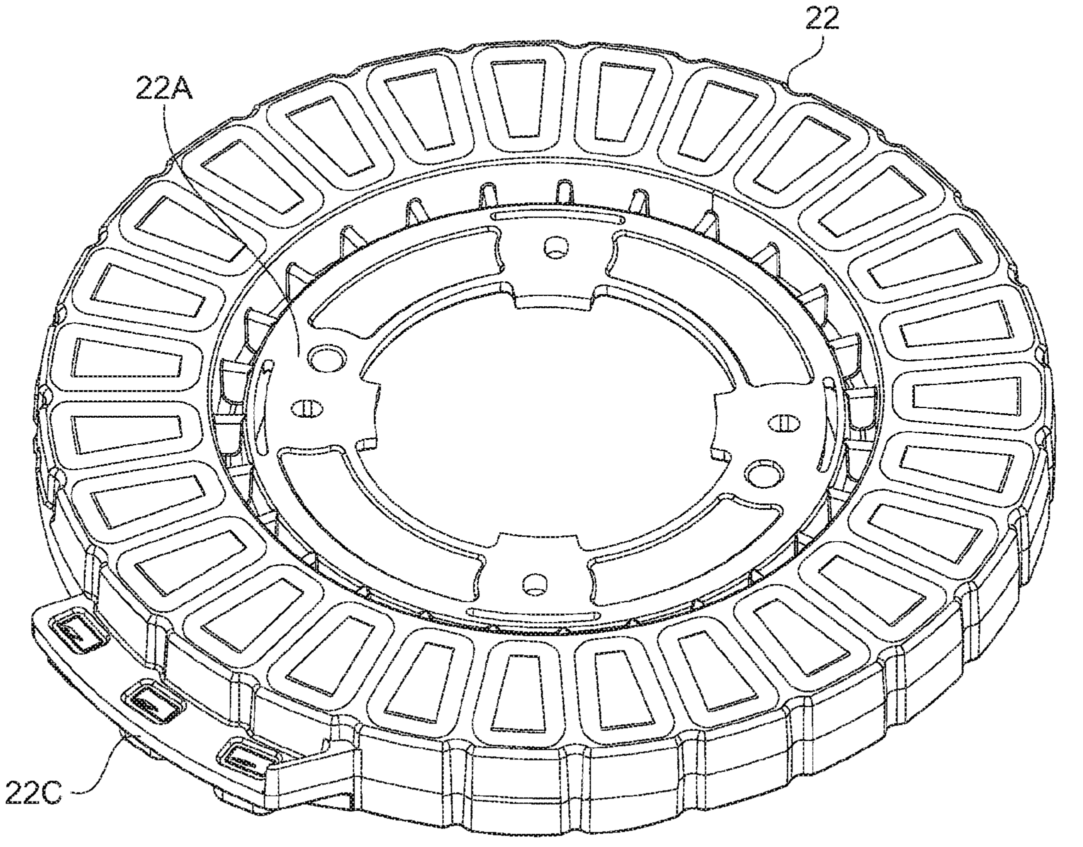
Figure 16F:
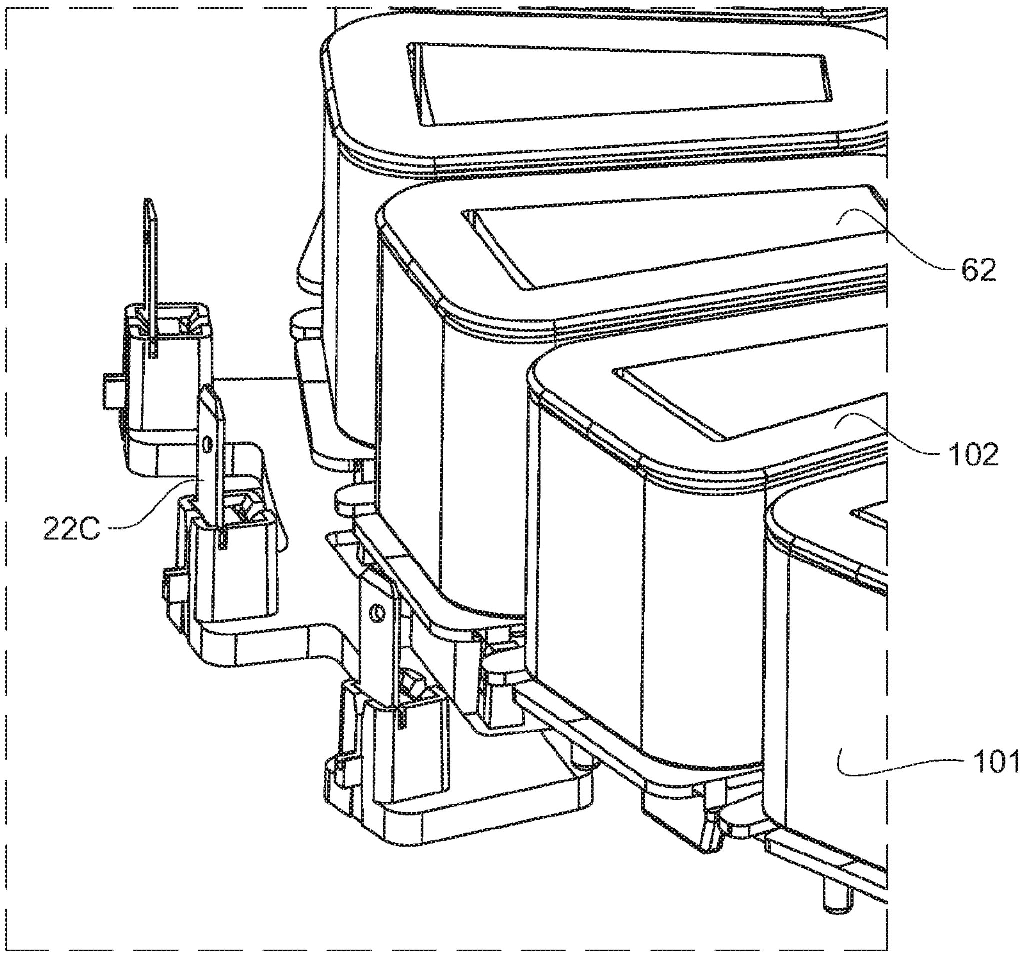

FIG. 16E shows the stator 22 of FIGS. 16C and 16D in isolation. As can be seen, the stator comprises a series of terminal connectors 22C each comprising a series of metallic terminal pins retained in plastic pockets, and extending therefrom. These connectors 22C are shown in more detail in FIG. 22C, that depicts a portion of the stator without an overmoulding.

Figure 2:
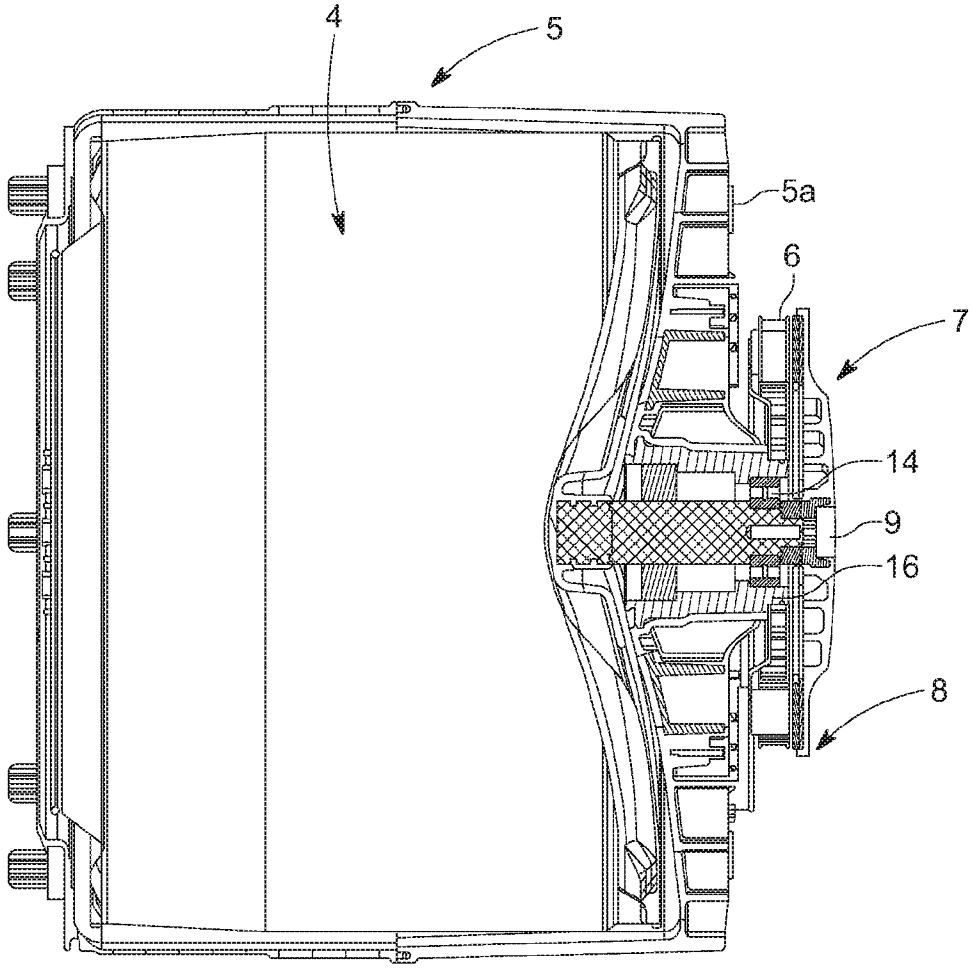
Figure 17A:
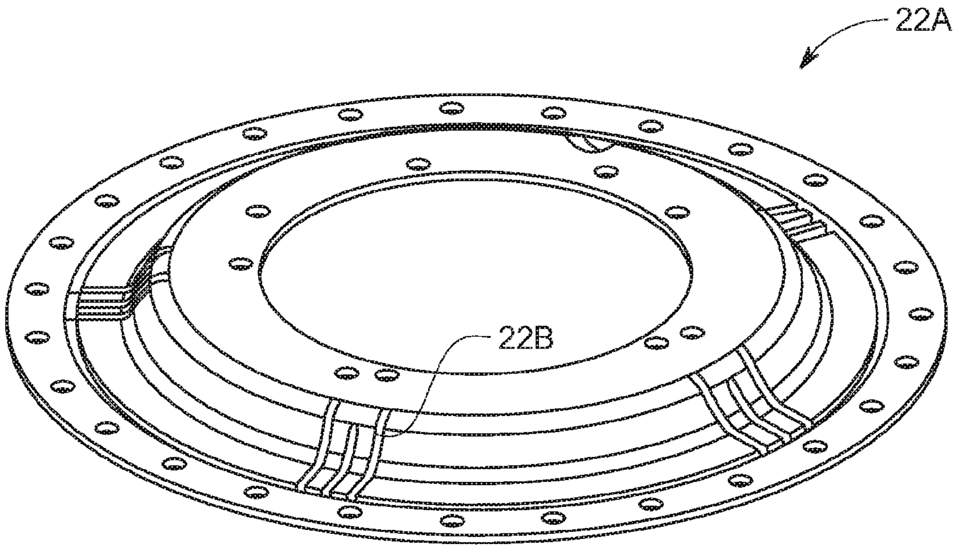
FIGS. 17A and 17B show alternative forms of the fastening portion according to embodiments of the invention.
Figure 17B:
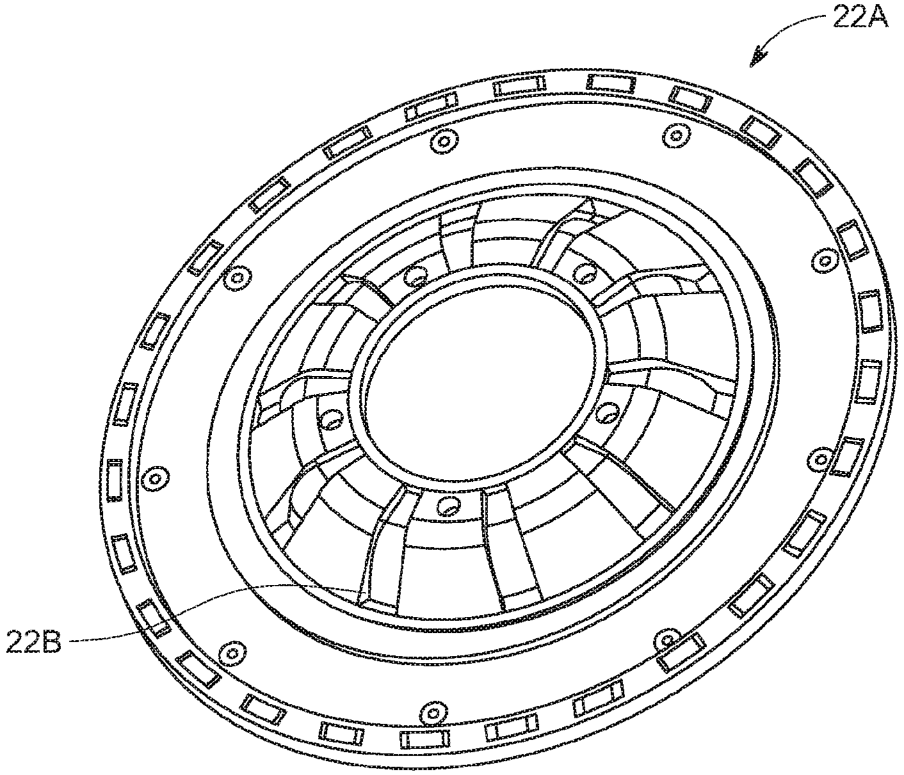

FIGS. 17A and 17B depict two alternative embodiments of a fastening portion 22A wherein the fastening portion 22A is provided separately to the stator 22, and can be situated between the stator and the end of the outer tub 5A to mount the motor as shown in FIG. 2. It is envisaged that the fastening portion 22A of FIG. 17A is formed of steel, whilst the fastening portion 22A of FIG. 17B is formed of an overmoulded polymeric material such as BMC, though any suitable material may be used. Both show a fastening portion 22A with a generally conical profile, comprising both an inner and outer annular region. The inner annular region comprises a series of apertures for attaching the fastening portion 22A to the washing machine (for example to the bearing housing 16, in which case the apertures align with the mounting holes 16A provided on the bearing housing 16), whilst the outer annular region comprising a series of apertures for attaching the fastening portion 22A to the stator core 60.

FIG. 17A further depicts a series of attenuating features 22B in the form of circumferentially and radially extending slots which serve to increase the elasticity of the mount so as to improve its vibration attenuation properties.

FIG. 17B further depicts attenuating features 22B in the form of reinforced and/or thickened sidewalls which increase the rigidity of the fastening portion 22A, such that its ability to attenuate vibrations may be tuned.

Additionally or alternatively, the fastening portion 22A of FIGS. 17A and 17B may include further attenuating features 22B in the form of radially or circumferentially extending ribs, as well as any combination of the attenuating features 22B described above.

Figure 18A:
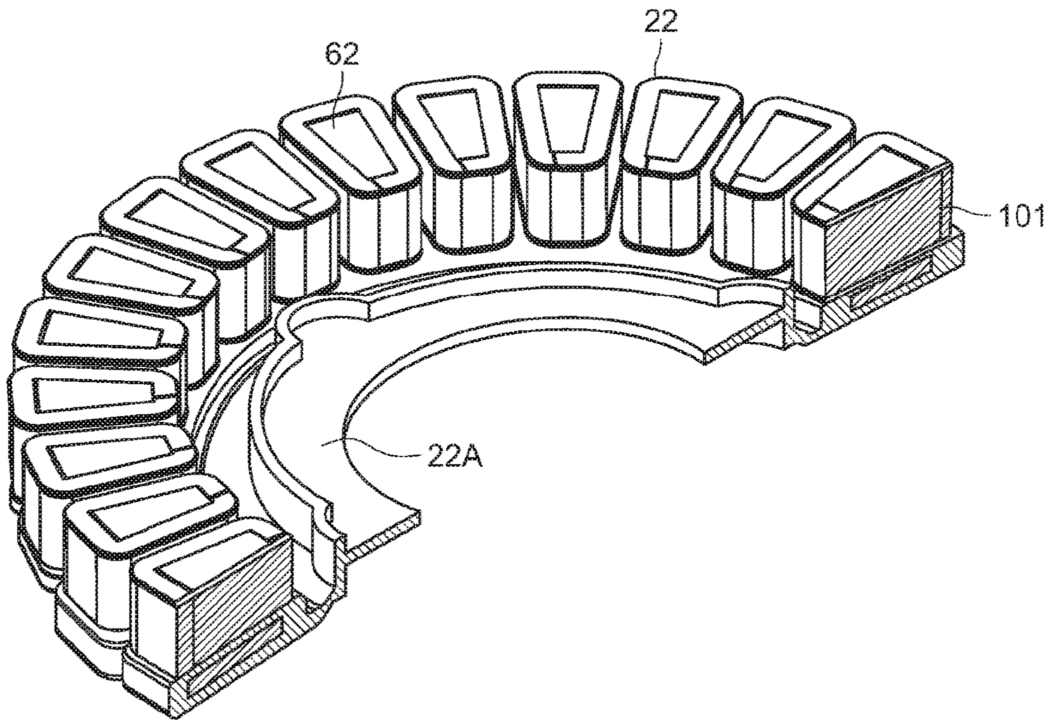
FIGS. 18A and 18B show the arrangement of the fastening portion of the stator according to an embodiment of the invention.

FIG. 18A shows an embodiment in which the fastening portion 22A is integral to an overmoulding of the stator core 60 wherein the stator coils 101 are wound around the stator teeth 62 after the stator core 60 has been overmoulded by a polymeric material such as BMC. In some embodiments, the overmoulded material functions as the, or a part of, the insulating structure 100. In some embodiments, the overmould provides the fastening portion 22A for securing the stator to the washing machine.

Figure 18B:
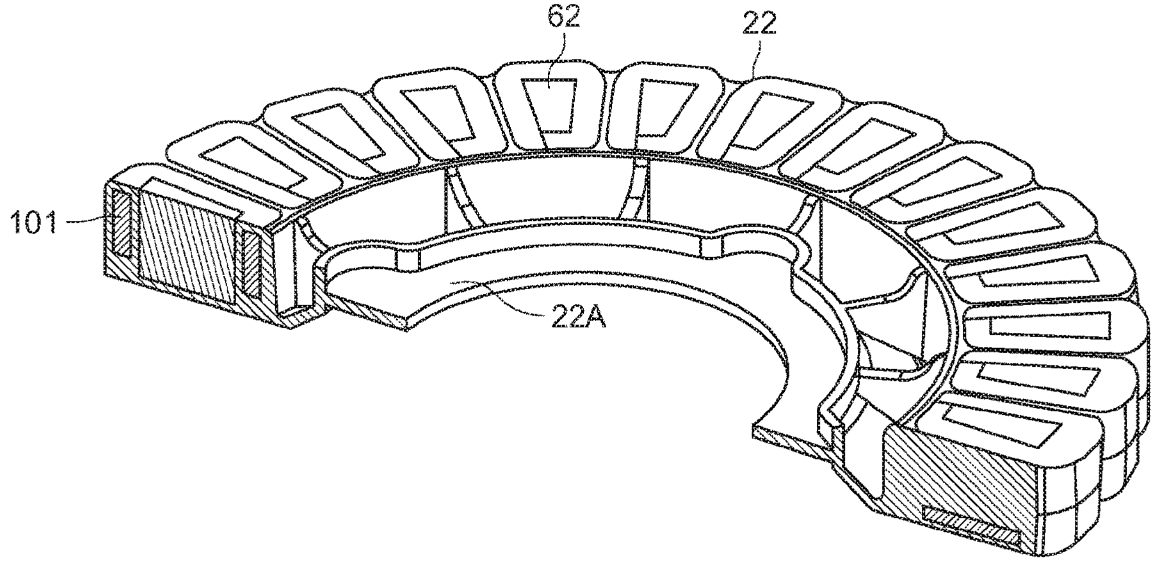

FIG. 18B depicts an alternative embodiment is which the stator coils 101 are would around the stator teeth 62 and insulating structure 100 before the stator assembly is overmoulded. As with the embodiment of FIG. 18A, the overmoulding provides the fastening portion 22A.

3.3 Separation Tool

The magnets on the rotor 21 strongly attract to the metallic core of the stator 22. For example, there may be a 60 kg magnetic force holding the rotor and stator together. In some circumstances (for example during manufacture, or for servicing) it may be necessary to separate the rotor from the stator.

Figure 19A:
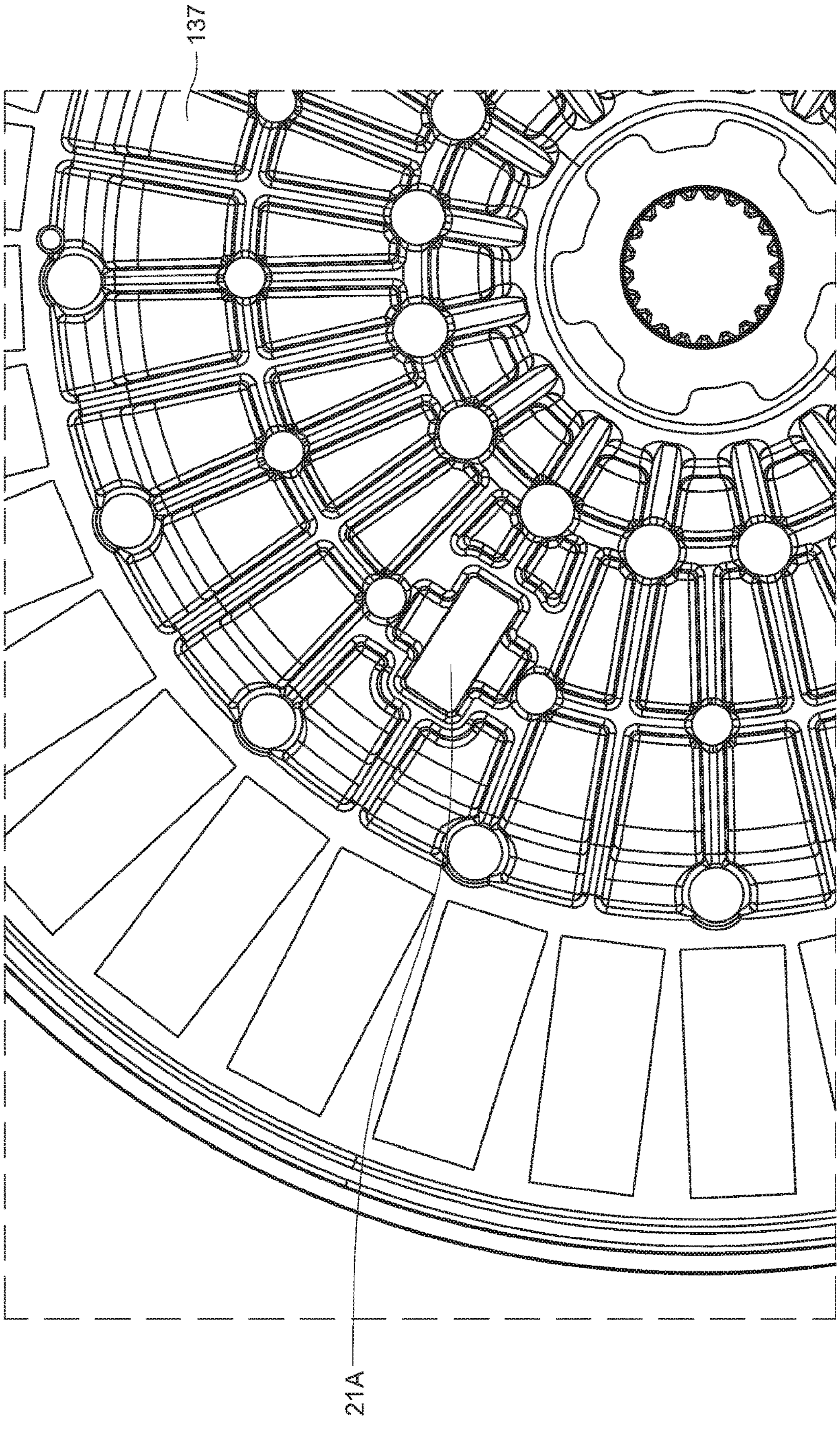
FIGS. 19A-19D show a separation tool for use with the motor according to an embodiment of the invention.

FIG. 19A shows an embodiment in which the rotor is formed with holes 21A adapted to engage with a tool 24 or assembly jig in order to allow the rotor 21 to be prized apart from the stator 22.

Figure 19B:
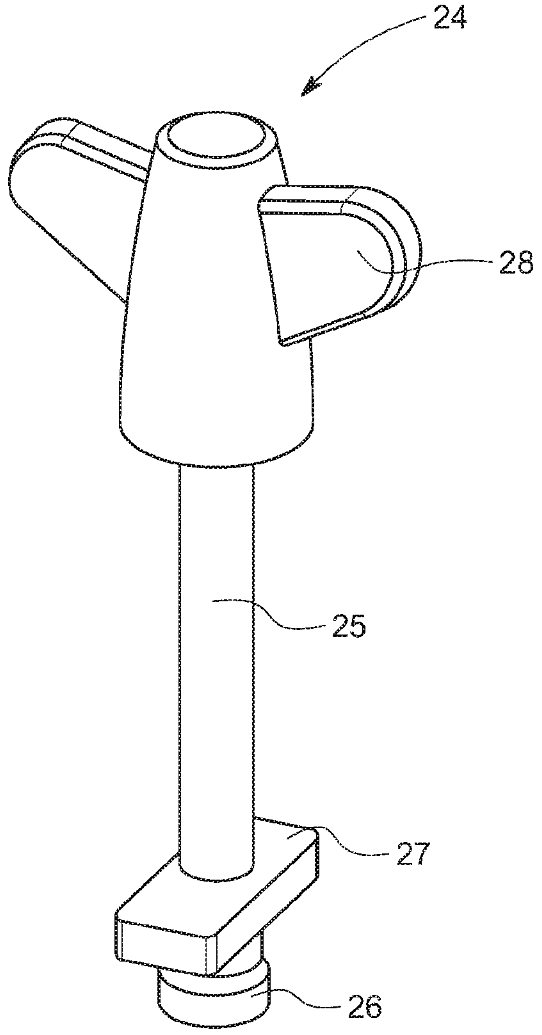

In some embodiments, the rotor may have one or more "plus shaped" hole formations 21A. These appear as a rectangular hole from the topside of the rotor frame 137, and a rectangular recess at 90 degrees to the rectangular hole when viewed from the underside. In some embodiments, a tool 24 with a threaded shaft 25, a foot 26, a rectangular nut 27 and a handle 28 (as shown in FIG. 19B) is provided for levering the rotor frame 137 away from the stator 22.

Figure 19C:
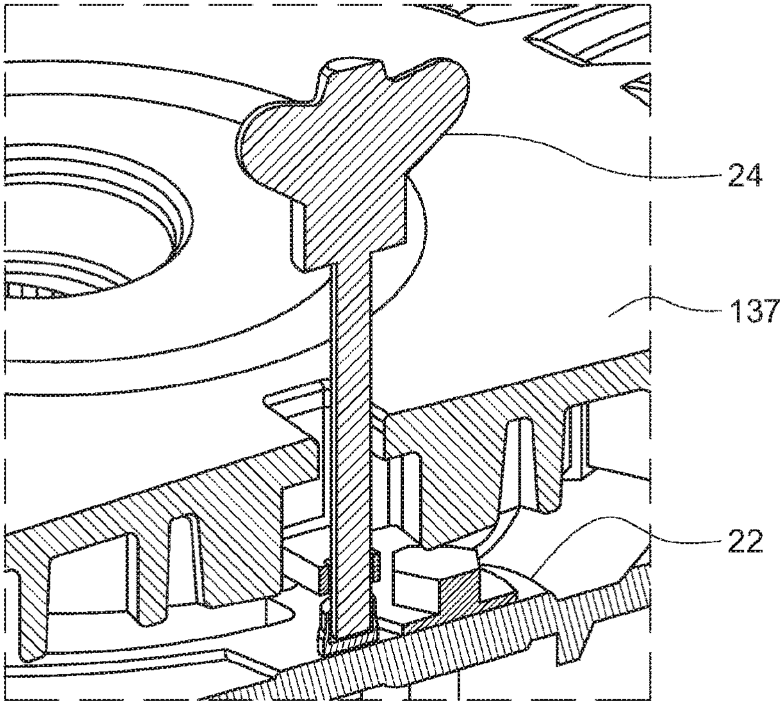
Figure 19D:
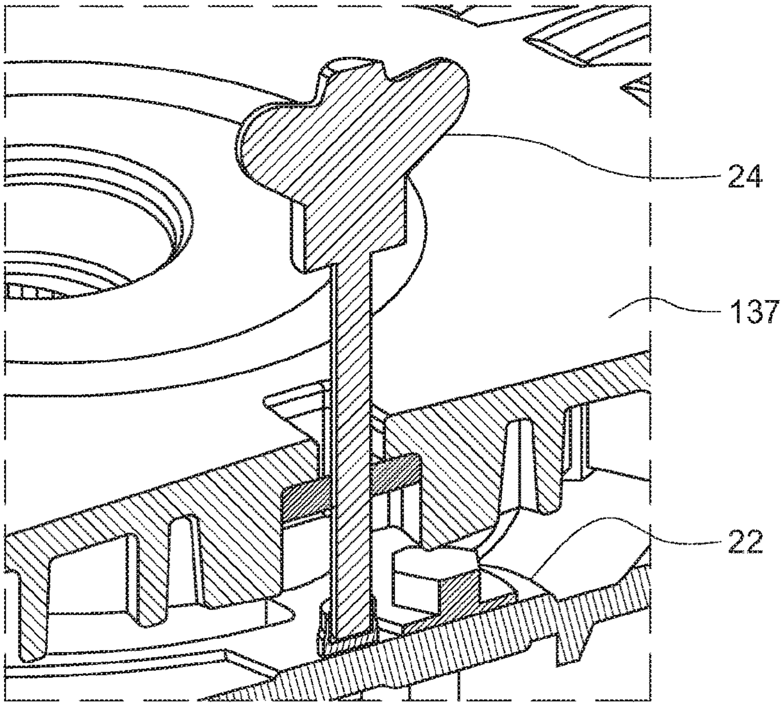

FIG. 19C shows that in use the shaft of the tool 24 is inserted through the hole 21A. As shown in FIG. 19D, the tool 24 is turned 90 degrees and the shaft 25 withdrawn a distance, so that the rectangular nut 27 becomes captured in the hole 21A and prevented from rotating with the shaft 25. By rotating the handle 28, the shaft 25 is screwed down until the foot 26 locates against the stator 22. Further rotation of the handle serves to "jack up" the rotor frame 137, and separate it from the stator 22.

3.4 Four Exemplary Embodiments

Four exemplary embodiments of an axial flux motor 20 will now be described, with reference to details of the rotor 21 and stator 22 dimensions and configurations.

| | Exemplary Embodiment 1 | Exemplary Embodiment 2 | Exemplary Embodiment 3 | Exemplary Embodiment 4 |
|---|---|---|---|---|
| Type | 3 Phase AF PMSM | 3 Phase AF PMSM | 3 Phase AF PMSM | 3 Phase AF PMSM |
| No. of stator slots | 27 | 27 | 27 | 27 |
| No. of rotor poles | 36 | 36 | 36 | 36 |
| Air gap [mm] | 1 | 1 | 1 | 1 |
| Stator coil windings-wire material | Aluminium | Aluminium | Aluminium | Aluminium |
| Torque constant (Nm/A) | 18.76 | 8.7 | 8.52 | 8.52 |
| Stator Core Outer Diameter [mm] | 275 | 275 | 265 | 259 |
| Stator Core Inner Diameter [mm] | 197 | 197 | 207 | 207 |
| Stator Core height [mm] | 25 | 27.5 | 27 | 27 |
| Stator Core Yoke Thickness [mm] | 4.5 | 5 | 5 | 4.5 |
| Stator Slot Opening [mm] | 16.82 | 15.8 | 16.6 | 16.26 |
| Stator Chamfer Axial Direction [mm] | none | 10.5 | none | none |
| Stator Chamfer Radial Direction [mm] | none | 1.5 | none | none |
| Rotor Magnetic Region Outer Diameter [mm] | 275 | 275 | 275 | 264 |
| Rotor Magnetic Region Inner Diameter [mm] | 197 | 197 | 197 | 202 |
| Magnet Thickness [mm] | 15 | 5 | 5 | 5 |
| Magnet type | sintered ferrite | sintered ferrite | sintered ferrite | sintered ferrite |
| Magnet shape | tapered | tapered | tapered | tapered |
| Gap between magnets [mm] | 2.06 | 2.06 | 2.06 | 3.3 |
| Magnet Chamfer Axial Direction [mm] | 1 | 1 | 1 | none |
| Magnet Chamfer Radial Direction [mm] | 2 | 2 | 2 | none |

4. Use of an Axial Flux Motor

An axial flux motor is described above can be used in a range of applications. In one example, it can be used to directly drive the load-containing drum in a front loading horizontal axis laundry machine, as described below. However the motor may alternatively be used to drive the load-containing drum in top or tilt access horizontal axis laundry washing machines, or top-loading, vertical axis laundry washing machines, or in laundry dryers or washer-dryers (which are conventionally horizontal access).

4.1 Laundry Machine with Axial Flux Motor

Referring to FIG. 1 a laundry machine 1 of the front-loading or horizontal-axis variety is shown. The front-loading machine includes an outer cabinet 2 with a front door 3 allowing access to a perforated rotatable inner drum 4 for holding a load of laundry such as clothing for washing, and mounted within the outer cabinet to rotate about a horizontal axis. A generally cylindrical, fixed (non-rotating) outer drum 5 for containing washing liquid is mounted (suspended) within the cabinet 2 around the rotating inner drum 4. A motor 7 (for example, the previously described axial flux motor 20) is attached at the rear of the outer drum 5 to directly drive rotation of the inner drum 4 relative to the outer drum 5 about the horizontal axis.

FIG. 2 shows, in cross section, the inner and outer drums 4 and 5, and motor 7, of a laundry machine such as that shown diagrammatically in FIG. 1. In FIG. 2 the outer cabinet 2 is not shown. The stator 6 of an axial flux motor 7 as described herein is fixedly attached at the end of the (non-rotating) outer drum 5 by mounting to the bearing housing structure 16 (which is held in the end wall 5A of outer drum 5) via a fastening portion 22A such as that shown in FIG. 17A or 17B. Alternatively, the fastening portion 22A is implemented as an integral part of the stator 6 (for example, the overmoulding) and is mounted to the bearing housing as shown in FIGS. 16A-16C. The bearing housing 16 may, for example, be insert moulded into a polymeric end wall 5A of the outer drum. Rotor 8 external to the outer drum 5 is rotationally fixed to the outer end of a rotor shaft 9 which extends through a passage in the end of the outer drum 5 and engages with the rotating inner drum 4 at its other end. The rotor shaft 9 is mounted via at least one or more bearings 14, such as roller bearings, carried by the bearing housing component 16. In this embodiment the stator 6 is fixed between the rotor 8 and tub end wall 5A, with the rotor 8 as the outermost part of the motor 7.

In some embodiments the axial flux motor is suitable for driving the load-containing drum of a laundry machine, in terms of its size, power, electricity requirements, torque and/or speeds. For example, in some embodiments the axial flux motor provides a torque constant of between about 7 to about 12 Nm/A, which makes it suitable for driving a laundry drum containing between about 8 kg and about 20 kg loads of laundry (including loads which have absorbed liquid). The motor may need to drive rotation of the drum at speeds of up to 1500-2000 RPM during various stages of a washing and/or drying cycle.

4.2 Advantages of Axial Flux Motor in a Laundry Machine

Using an axial flux motor 20 such as described herein for a laundry machine has the potential provide an advantage over the prior art, including to deliver the following benefits:

- Improved starting torque capability: the motor produces more torque for a given diameter, when compared to RF-PMSM motors
- Lower temperature Rise/faster wash cycles: the single stator, single rotor type of AF-PMSM has better heat-sinking capabilities compared to RF-PMSM outer rotor motors
- Improved vibration attenuation and noise performance
- Improved stability of air gap between stator and rotor.

The foregoing describes the invention including preferred forms thereof. Modifications and alterations as will be obvious to those skilled in the art may be made without departing from the scope of the invention, as defined in the claims.

The invention claimed is:

1. An axial flux permanent magnet synchronous motor for use in driving a laundry machine, the motor comprising:
- a stator comprising a plurality of stator coils arranged about an annular core of the stator, and an insulating structure to electrically insulate the stator coils;
- a rotor concentric with the stator and carrying a plurality of permanent magnets,
- wherein the rotor is configured to rotate relative to the stator about a common axis through the interaction of magnetic fields generated by the stator coils and permanent magnets, and
- wherein the rotor and stator are spaced relative to one another along the common axis so that the magnetic flux path between the rotor magnets and stator coils is oriented in an axial direction; and
- a fastening portion for attaching the stator to a body of the laundry machine, the fastening portion comprising an inner annular region extending radially inward of the annular core of the stator, the inner annular region comprising apertures for receiving fasteners.

2. The motor of claim 1 comprising a single rotor and a single stator.

3. The motor of claim 1 wherein a ratio of magnetic poles carried by the stator to magnetic poles carried by the rotor is 3:4.

4. The motor of claim 1 wherein the stator coils are electrically connected to one another in a 3 phase configuration.

5. The motor of claim 1 wherein the stator core is spiral wound from electrical steel strips.

6. The motor of claim 1 wherein the stator core comprises a plurality of teeth extending in the axial direction, and
- wherein each one of the stator coils is carried by a corresponding one of the teeth.

7. The motor of claim 6 wherein the teeth have a tipless shape.

8. The motor of claim 6 wherein the insulating structure comprises a plurality of bobbins, each of which is mounted upon a one of the teeth and carries one of the stator coils.

9. The motor of claim 8 wherein one or more of the bobbins comprise a guide structure configured to maintain a physical separation between electrical connections of adjacent stator coils.

10. The motor of claim 1 wherein the permanent magnets are each a discrete piece of magnetic material formed in a rectangular shape, or alternatively, are each a discrete piece of magnetic material formed in a tapered shape.

11. The motor of claim 1 wherein each magnetic pole of the rotor is represented by a single discrete piece of magnetic material.

12. The motor of claim 1 wherein the permanent magnets are arranged about an annular region of the rotor concentric with the annular core of the stator.

13. The motor of claim 1 wherein the rotor is a moulded polymeric material.

14. The motor of claim 1 wherein the rotor comprises a rotor hub for connecting the rotor to a drive shaft of the laundry machine, and optionally wherein the rotor hub is made of steel.

15. The motor of claim 14 wherein the rotor hub is insert moulded into a polymeric material of the rotor.

16. The motor of claim 14 wherein the rotor has a profile such that a height of the rotor is greatest at or near the rotor hub, and decreases at or toward an annular region.

17. The motor claim 1 wherein the fastening portion is formed as part of the stator itself.

18. The motor of claim 1 wherein the fastening portion is configured to attach the stator to a rear of an outer drum of the laundry machine.

19. An axial flux permanent magnet synchronous motor for use in driving a laundry machine, the motor comprising:
- a stator comprising a plurality of stator coils arranged about an annular core of the stator, and an insulating structure to electrically insulate the stator coils;
- a rotor concentric with the stator and carrying a plurality of permanent magnets,
- wherein the rotor is configured to rotate relative to the stator about a common axis through the interaction of magnetic fields generated by the stator coils and permanent magnets, and
- wherein the rotor and stator are spaced relative to one another along the common axis so that the magnetic flux path between the rotor magnets and stator coils is oriented in an axial direction; and a fastening portion for attaching the stator to a body of the laundry machine, the fastening portion being an over-moulding of the stator core.

20. A laundry machine comprising: an outer cabinet, cabinet;

an outer drum suspended in the outer cabinet;

an inner drum housed within the outer drum and rotatable relative to the outer drum; and, an axial flux permanent magnet synchronous motor configured to directly drive rotation of the inner drum, the motor comprising:

a stator comprising a plurality of stator coils arranged about an annular core of the stator, and an insulating structure to electrically insulate the stator coils;

a rotor concentric with the stator and carrying a plurality of permanent magnets, wherein the rotor is configured to rotate relative to the stator about a common axis through the interaction of magnetic fields generated by the stator coils and permanent magnets, and wherein the rotor and stator are spaced relative to one another along the common axis so that the magnetic flux path between the rotor magnets and stator coils is oriented in an axial direction; and a fastening portion for attaching the stator to a body of the laundry machine, the fastening portion comprising an inner annular region extending radially inward of the annular core of the stator, the inner annular region comprising apertures for receiving fasteners.

* * * * *